United States Patent
Takahama et al.

(10) Patent No.: US 6,221,498 B1
(45) Date of Patent: Apr. 24, 2001

(54) ANTIFOULING SILICONE EMULSION COATING-COMPOSITION, PROCESS FOR PRODUCING THE SAME AND ANTIFOULING ARTICLE COATED THEREWITH

(75) Inventors: Koichi Takahama, Amagasaki; Takeyuki Yamaki, Neyagwa; Minoru Inoue; Akiharu Goto, both of Katano; Junko Ikenaga, Osaka; Hirotsugu Kishimoto, Toyonaka, all of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/180,763

(22) PCT Filed: Mar. 13, 1998

(86) PCT No.: PCT/JP98/01071

§ 371 Date: Jan. 11, 1999

§ 102(e) Date: Jan. 11, 1999

(87) PCT Pub. No.: WO98/41589

PCT Pub. Date: Sep. 24, 1998

(30) Foreign Application Priority Data

Mar. 14, 1997 (JP) .................................................... 9-061573

(51) Int. Cl.$^7$ ...................................................... B32B 9/04
(52) U.S. Cl. ...................... 428/447; 428/450; 428/451; 524/413; 524/497; 524/588; 524/837; 524/839; 525/902; 106/287.12
(58) Field of Search ........................ 106/287.12; 524/413, 524/497, 588, 837, 839; 525/902; 428/447, 450, 451

(56) References Cited

U.S. PATENT DOCUMENTS 6,025,077 * 2/2000 Yamaki et al. ........................ 428/447

FOREIGN PATENT DOCUMENTS

| 0633064A | 1/1995 | (EP) . |
| 0816466A | 1/1998 | (EP) . |
| 0857770A | 8/1998 | (EP) . |
| 0887392A | 12/1998 | (EP) . |
| 0903389A | 3/1999 | (EP) . |
| 61-83106 | 4/1986 | (JP) . |
| 9629375 | 9/1996 | (WO) . |

* cited by examiner

*Primary Examiner*—D. S. Nakarani
(74) *Attorney, Agent, or Firm*—Birch, Stewart, Kolasch & Birch, LLP

(57) ABSTRACT

An antifouling silicone emulsion coating-composition comprising following components (A), (B), (C) and (D), an amount of the component (C) incorporated being in the range of 5 to 80% by weight relative to the total solid contents in the composition:

(A) partially hydrolyzed organosiloxane with a weight-average molecular weight of 600 to 5,000 (determined using a polystyrene calibration curve), represented by the average formula (I): $R^2{}_aSiO_b(OR^1)_c(OH)_d$ wherein $R^1$ and $R^2$ represent a monovalent hydrocarbon group; a, b, c and d are numerals satisfying the following relationships: $a+2b+c+d=4$, $0 \leq a<3$, $0<b<2$, $0<c<4$, and $0<d<4$;

(B) nonionic or anionic surface active agent;

(C) photo-semiconductor; and (D) water.

16 Claims, No Drawings

ANTIFOULING SILICONE EMULSION COATING-COMPOSITION, PROCESS FOR PRODUCING THE SAME AND ANTIFOULING ARTICLE COATED THEREWITH

This application claims the benefit under 35 U.S.C. §371 of prior PCT International Application No. PCT/JP98/01071 which has an International filing date of Mar. 13, 1998 which designated the United States of America, the entire contents of which are hereby incorporated by reference.

1. Field of the Invention

The present invention relates to an antifouling silicone emulsion coating-composition which can form a coat excellent in antifouling properties, antifogging properties, transparency, weather resistance, durability etc., a process for the producing the same, and an article applied with said composition.

2. Background of the Invention

It is known that upon exposure of a photo-semiconductor to: UV rays, active oxygen is generated (photo-catalysis). Because active oxygen can oxidize and decompose organic materials, an article having a photo-semiconductor layer or a photo-semiconductor-containing coat formed on the surface of a substrate is expected to have the self-washing effect of decomposing carbon-type dirt components (e.g. carbon fractions contained in an exhaust gas from automobiles or nicotine in tobacco, etc.) adhered to its surface; the deodorizing effect of decomposing foul-odor components represented by amine compounds and aldehyde compounds; and the anti-microbial effect of preventing generation of microbial components represented by E. coli and yellow staphylococci. Upon exposure of a photo-semiconductor-containing coat to UV rays, dirt such as water-repellant organic materials etc. adhering to the surface of the coat is decomposed and removers by the photo-semiconductor, so that there is the effect that the contact angle of water to the surface of the coat is lowered and the surface of the coat is readily wetted with water (see e.g. Japanese Patent Publication Laid-Open No. 83,106/1986, WO 96/29375 etc.). From this effect, the antifogging effect by which glass and mirrors in indoor members are hardly fogged with water drops while dirt adhered to outdoor members is washed away with rain water is expected.

Fine particles of titanium oxide made anatase crystals by thermal treatment at the producing time, or a water dispersion thereof, are or is commercially available. Thermal treatment at 300° C. or more is, however, required to form a titanium oxide layer having sufficient strength on the surface of a substrate by sintering such fine particles at particle interface. The substrate is limited to the one having thermal resistance.

The method of fixing photo-catalytic titanium oxide on the surface of a substrate whose thermal resistance is less than 300° C. is known as, for example, a method of fixing fine particles of titanium oxide in the form of said anatase crystals by use of a low-temperature setting binder. However, if titanium oxide is fixed in an organic type binder, active oxygen will also decompose the organic binder. Durability cannot be expected with respect to the organic binder composite.

On the other hand, an inorganic binder is hardly decomposed with active oxygen. The inorganic low-temperature setting binder includes, for example, a silicone coating material.

SUMMARY OF THE INVENTION

However, as the photo-semiconductor is generally a metallic oxide, dispersion medium-therefor is required to be water to readily disperse the photo-semiconductor. If transparency is required for a desired coat, the particle size of the photo-semiconductor should also be ultrafine particles of 0.1 $\mu$m or less in average diameter. However, because the conventional silicone coating material is an organic solvent type, it is difficult to disperse the photo-semiconductor uniformly in the silicone coating material. The photo-semiconductor is readily aggregated and precipitated so that it is hard for the resulting coat to sufficiently achieve the desired photo-catalytic performance. In addition, said coat has low transparency and readily turns opaque. Its utilities are limited.

Accordingly, an object of the present invention is to provides an antifouling silicone emulsion coating-composition which can be cured at lower temperatures than 300° C., has a photo-semiconductor uniformly dispersed therein, and can form a coat excellent in transparency, weather resistance, durability etc. in addition to various characteristics derived from the photo-catalysis of a photo-semiconductor, such as antifouling properties, antifogging properties etc.

Another object of the present invention is to provide a process for producing the composition, and an antifouling article applied with the said composition.

MEANS TO SOLVE THE PROBLEMS

The antifouling silicone emulsion coating-composition of the present invention comprises the following components (A), (B), (C) and (D), wherein an amount of the component (C) incorporated is in the range of 5 to 80% by weight relative to the total solid contents in the composition;

(A) Partially hydrolyzed organosiloxane with a weight-average molecular weight of 600 to 5000 (determined using a polystyrene calibration curve), represented by the average formula (I): $R^2aSiOb(OR^1)c(OH)d$ wherein $R^1$ and $R^2$ represent a monovalent hydrocarbon group; a, b, c and d are numerals satisfying the following relationships: $a+2b+c+d=4$, $0 a \leq 3$, $0<b<2$, $0<c<4$, and $0<d<4$;

(B) Nonionic surface active agent or anionic surface active agent;

(C) Photo-semiconductor.

(D) Water.

The above component (D) is preferably titanium oxide.

The above component (C) is preferably fine particles with an average primary particle diameter of 0.001 to 0.03 $\mu$m.

The antifouling silicone emulsion coating-composition of the present invention can also contain colloidal silica.

The antifouling silicone emulsion coating-composition of the present invention can also contain the following component (E). (E) Straight-chain polysiloxane diol containing hydroxyl groups at both terminals, represented by the average formula (II): $HO(R^3_2SiO)nH$ wherein $R^3$ represents a monovalent hydrocarbon group, and n is a numeral of $3 \leq n \leq 50$.

The antifouling silicone emulsion coating-composition of the present invention can also contain at least one organic resin selected from the group consisting of alkyd resin, epoxy resin, acrylic resin, acrylic silicone resin, phenol resin, fluorine resin, polyester resin, chlorinated rubber resin, urethane resin and melamine resin.

The above organic resin is preferably the following component (F). (F) Acrylic resin which is a copolymer of monomers represented by the general formula (III): $CH_2=CR^4(COOR^5)$ wherein $R^4$ represents a hydrogen atom and/or a methyl group, said monomers comprising a first (meth) acrylate wherein $R^5$ is a substituted or unsubstituted C1 to C9 monovalent hydrocarbon group, a second (meth)acrylate wherein $R^5$ is at least one group selected from the group consisting of an epoxy group, a glycidyl group and a hydrocarbon group containing an epoxy group and/or a glycidyl group, and a third (meth)acrylate wherein $R^5$ is a hydrocarbon group containing an alkoxysilyl group and/or a halogenated silyl group.

In the present specification, the (meth)acrylate means to acrylate and/or methacrylate.

The antifouling silicone emulsion coating-composition of the present invention may also contain a pigment.

The first process for producing an antifouling silicone emulsion coating-composition according to the present invention comprises the step of mixing an emulsion containing the above components (A), (B) and (D) with a powder of the above component (C) and/or a dispersion having said powder dispersed in the above component (D).

The second process for producing an antifouling silicone emulsion coating-composition according to the present invention comprises the step of removing an organic solvent from a mixture of the above components (A) and (C) and the organic solvent to obtain a desolvated material and the step of mixing said desolvated material with the above components (B) and (D).

The third process for producing an antifouling silicone emulsion coating-composition according to the present invention comprises the step of mixing a hydrolyzable organosilane represented by the general formula (IV): $R^2_m Si(OR^1)_{4-m}$ (wherein $R^1$ and $R^2$ represent a monovalent hydrocarbon group, and m is an integer of 0 to 3), a powder of the above component (C) and/or a dispersion thereof, and the above component (D), to give a mixture containing the above components (A) and (C) and the step of mixing said mixture with the above component (B), and an additional component (D) if required.

The antifouling coated article of the present invention comprises an applied cured coat of the antifouling silicone emulsion coating-composition of the present invention on the surface of a substrate.

Said substrate is preferably selected from the group consisting of an inorganic substrate, organic substrate, inorganic/organic composite substrate, and a coated substrate having at least one layer of an inorganic coat and/or at least one layer of an organic coat on any one of said substrates, and a coated substrate having an organic inorganic composite coat thereon and a substrate having a laminated coat thereof.

The coat on the surface of said applied substrate may be a primer layer.

DETAILED DESCRIPTION OF THE INVENTION

The partially hydrolyzed organosiloxane used as component (A) in the composition of the present invention (referred to hereinafter as "partially hydrolyzed organosiloxane (A)") has both —$OR^1$ group and —OH group (both of which are bound directly to a silicon atom) at the terminals and is a 3-dimensional-cross-linkable silicone compound.

$R^1$ and $R^2$ in the above formula (I) representing partially hydrolyzed organosiloxane (A) are monovalent hydrocarbon groups which may be the same or different.

$R^2$ is not particularly limited insofar as it is a monovalent hydrocarbon group, and it is preferably a substituted or unsubstituted C1 to C8 monovalent hydrocarbon group The examples thereof include alkyl groups such as a methyl group, an ethyl group, a propyl group, a butyl group, a pentyl group, a hexyl group, a heptyl group, an octyl group etc.; cycloalkyl groups such as a cyclopentyl group, a cyclohexyl group etc.; aralkyl groups such as a 2-phenylethyl group, a 3-phenylpropyl group etc.; aryl groups such as a phenyl group, a tolyl group etc.; alkenyl groups such as a vinyl group, an allyl group etc.; halogen-substituted hydrocarbon groups such as a chloromethyl group, a γ-chloropropyl group, a 3,3,3-trifluoropropyl group etc.; substituted hydrocarbon groups such as a γ-methacryloxypropyl group, γ-glycidoxypropyl group, a 3,4-epoxycyclohexylethyl group, a γ-mercaptopropyl group etc. Among these, a C1 to C4 alkyl group and a phenyl group are preferable because of their easy synthesis or availability.

$R^1$ is not particularly limited insofar as it is a monovalent hydrocarbon group, and for example, a C1 to C4 alkyl group is preferable.

A process for producing partially hydrolyzed organosiloxane (A) is not particularly limited. For example, if the partially hydrolyzed organosiloxane of the above formula (I) wherein $R^1$ is an alkyl group ($OR^1$ is an alkoxy group) is to be obtained, one or two or more hydrolyzable organosilanes selected from the group consisting of hydrolyzable organochlorosilanes and hydrolyzable organoalkoxysilanes are hydrolyzed with a large amount of water according to a method known in the art to give a silanol group-containing polyorganosiloxane, and then silanol groups in this product are partially alkoxylated, whereby partially hydrolyzed organosiloxane (A) can be obtained. In this preparation process, if a hydrolyzable organoalkoxysilane is to be hydrolyzed, a part of its alkoxy groups are hydrolyzed in the conditions of a regulated amount of water, whereby partially hydrolyzed organosiloxane (A) having both unreacted alkoxy groups and silanol groups can be obtained. In this case, the treatment for partial alkoxylation of silanol groups in the above-described silanol group-containing organosiloxane may be eliminated.

The above hydrolyzable organochlorosilane includes, but is not limited to, methyltrichlorosilane, dimethyldichlorosilane, phenyltrichlorosilane, diphenyldichlorosilane etc.

The above hydrolyzable organoalkoxysilane is not particularly limited, by the following is exemplified; hydrolyzable organosilanes represented by the above formula (IV) wherein $R^1$ is an alkyl group. Specific examples of tetralkoxysilanes where m=0 are tetramethoxysilane, tetraethoxysilane etc., and examples of organotrialkoxysilanes where m=1 are methyl trimethoxysilane, methyl triethoxysilane, methyl triisopropoxysilane, phenyl trimethoxysilane, phenyltriethoxysilane, 3,3,3-trifluoropropyltrimethoxysilane etc. Examples of diorganodialkoxysilanes where m=2 are dimethyldimethoxysilane, dimethyl diethoxysilane, diphenyldimethoxysilane, diphenyldiethoxysilane, methylphenyldimethoxysilane etc., and examples of triorganoalkoxysilanes where m=3 are trimethylmethoxysilane, trimethylethoxysilane, triethylmethoxysilane, trimethylisopropoxysilane, dimethylisobutylmethoxysilane etc.

The catalyst used for partial hydrolysis of the hydrolyzable organosilane is not particularly limited, but exemplified by acidlic catalysts including water-soluble acids such as hydrochloric acid, nitric acid etc., acidic colloidal silica etc., and basic catalysts including aqueous solutions of ammonia, basic colloidal silica etc. If a hydrolyzable alkoxysilane where $R^1$ is a lower alkyl group is used as the hydrolyzable organosilane, a lower aliphatic alcohol is generated in its partial hydrolysis, and this lower aliphatic alcohol is an amphiphatic solvent which causes a reduction in the stability of the emulsion. It is preferable to remove the solvent previously in preparing the composition of the present invention.

In the above formula (I) representing the partially hydrolyzed organosiloxane (A), a, b, c, and d are numerals satisfying the above-described relationships. If a is 3 or more, there is the disadvantage that curing of a coat after applied does not proceed well. If b=0, the formula shows a monomer. There is the problem that no cured coat can be formed. If b is 2, the formula shows silica (SiO2 (which isnotanorganosiloxane)). There is the problem that cracking occurs in the cured coat. If c=0, the resulting molecular terminals are only an $R^2$ group and an hydrophilic OH group. The hydrophilicity of the molecule increases, so that the stability of the emulsion for a long period of time cannot be obtained. If c=4, the formula shows a monomer. There is the problem that no cured coat can be formed. If d=0, the molecular terminals are only $R^2$ and $OR^1$ groups, both of which are hydrophobic groups. These groups are advantageous for long-term stability of the emulsion, but a sufficiently cured coat cannot be obtained because the $OR^1$ group lacks in crosslinking reactivity at the time of curing of an applied coat,. If d=4, the formula shows a monomer. There is the problem that no cured coat can be formed.

A weight-average molecular weight of the partially hydrolyzed organosiloxane (A) is in the range of 600 to 5000 determined using a polystyrene calibration curve. A molecular weight of less than 600 may cause a problem such as cracking in an applied cured coat. A molecular weight exceeding 5,000 causes the problem that curing does not proceed well.

Since the partially hydrolyzed organosiloxane (A) has the above-described structure and its weight-average molecular weight within the above predetermined range, its reactivity is high. Therefore, the composition of the present invention containing the same does not require a curing catalyst for curing a coat thereof, and not only heating curing but low-temperature curing is also possible. In spite of its high reactivity, the partially hydrolyzed organosiloxane (A) is excellent in the hydrophilicity-hydrophobicity balance in the molecular terminals to achieve stable emulsification for a long period of time.

An amount of the partially hydrolyzed organosiloxane (A) incorporated into the composition of the present invention is not more than 30%, preferably not more than 20% by weight. If the amount is more than 30% by weight, the transparency of the resulting coat is lowered or cracking easily occurs in the coat, and the stability of the water-soluble composition tends to be lowered.

The surface active agent used as component (B) in the composition of the present invention functions as an emulsifier for permitting the partially hydrolyzed organosiloxane (A) to be dispersed as emulsion particles in water.

Further, because the surface active agent (B) has the effect of facilitating water-wetting of the surface of an applied cured coat of the composition of the present invention, the coat demonstrates antifogging performance and antifouling performance by washing with rain water from the start of its formation without forcibly irradiating the coat with UV rays. The surface active agent (B) may be deteriorated on the surface of the applied cured coat or washed away with rain water to be eluted from the surface of said coat, but even in such cases, the photo-semiconductor (C) contained in said coat demonstrates photo-catalytic performance upon irradiation with natural light or artificial light in a room etc., thereby water-wettability is given on the surface of the coat to permit the surface of the coat to maintain its wettability with water for a long period of time from the start of the coating formation.

The surface active agent (B) is a surface active agent which has an HLB of 9 or more, preferably 10 or more for the stability of an emulsion obtained as the composition of the present invention. At least one of nonionic or anionic surface active agents, preferably nonionic surface active agents is used for preventing the deterioration of the stability of other components and for stability of the emulsion for a long period of time.

As the nonionic surface active agent, it is possible to use polyoxyethylene-added nonionic surface active agents, oxyethylene-oxypropylene copolymers, polyhydric alcohol fatty acid partial esters, polyoxyethylated polyhydric alcohol aliphatic esters etc. Among these, polyoxyethylene-added nonionic surface active agents such as polyoxyethylene alkyl ethers, polyoxyethylene alkyl aryl ethers, polyoxyethylene sorbitan fatty acid esters etc. are preferable. More specifically, polyoxyethylene alkyl ethers such as polyoxyethylene lauryl ethers etc., polyoxyethylene alkyl aryl ethers such as polyoxyethylene nonyl phenyl ethers, polyoxyethylene sorbitan fatty acid esters such as polyoxyethylene sorbitan monopalmitate etc. These surface active agents can be used solely or in combination thereof.

As the anionic surface active agent, it is possible to employ, for example, alkylbenzene sulfonates, alkyl naphthalene sulfonates, fatty acid salts, rosin acid salts, dialkyl sulfosuccinates, hydroxy alkane sulfonates, alkane sulfonates, alkyl sulfates, alkyl phosphates, polyoxyethylene alkyl aryl ether sulfates etc.

An amount of the surface active agent (B) incorporated into the composition of the present invention is 1 to 40% by weight, preferably 5 to 35% by weight, more preferably 5 to 31% by weight relative to the partially hydrolyzed organosiloxane (A). If the amount is less than 1% by weight, emulsification tends to be difficult. If the amount exceeds 40% by weight, the curing properties and weather resistance of the resulting coat are deteriorated, or the surface active agent (B) is decomposed by the catalytic action of the photo-semiconductor, thus being yellowed or transferred onto the surface of the coat to cause whitening of the coat and to finally deteriorate the cured coat so that the durability of the cured coat may be lost.

The photo-semiconductor (referred to hereinafter as "photo-semiconductor (C)") used as component (C) in the composition of the present invention is not particularly limited, but the following may be exemplified; metallic oxides such as titanium oxide, zinc oxide, tin oxide, zirconium oxide, tungsten oxide, chromium oxide, molybdenum oxide, iron oxide, nickel oxide, ruthenium oxide, cobalt oxide, copper oxide, manganese oxide, germanium oxide, lead oxide, cadmium oxide, vanadiumoxide, niobiumoxide, tantalumoxide, rhodium oxide, rhenium oxide etc., and as strontium titanate etc. as well Among these compounds, titanium oxide, zinc xide, tin oxide, zirconium oxide, tungsten oxide, iron oxide and niobium oxide are preferable because they exhibit activity even after baking arid curing at a low temperature of 100° C. or less. Among these, titanium oxide is particularly preferable because of its photo-catalytic performance, safety, easy availability, and costs. When titanium oxide is used as photo-semiconductor (C), titanium oxide of an anatase crystal type is preferably used because it exhibits the highest photo-catalytic performance for a prolonged period of time.

The shape of the photo-semiconductor (C) is not particularly limited. But, for example, it may be in the form of particle, needle etc. For mixing stability and dispersion stability, granular particles, particularly fine particles are preferable.

The photo-semiconductor (C) is not particularly limited insofar as even its starting material finally exhibits the properties of the photo-semiconductor.

The average primary particle diameter of the photo-semiconductor (C) is 1 to 50,000 nm, preferably 1 to 50 nm, more preferably 1 to 30 nm so that it is stably dispersed and does not form any precipitation of hard cakes etc. If coat transparency is required, the diameter is preferably 1 to 30 nm.

One kind or a combination of two or more kinds of the photo-semiconductor (C) may be used.

It is known that upon exposure to UV rays, the photo-semiconductor (C) generates active oxygen (photo-catalysis). Because active oxygen can oxidize and decompose organic materials, this character is utilized to achieve the self-washing effect of decomposing carbon-type dirt components (e.g. carbon fractions contained in an exhaust gas from automobiles or nicotine in tobacco, etc.) having adhered to the surface of a coated article; the deodorizing effect of decomposing foul-odor components represented by amine compounds and aldehyde compounds; and the anti-microbial effect of preventing generation of microbial components represented by $E.$ $coli$ and yellow staphylococci. Further, because dirt such as water-repellant organic matter etc. having adhered to the surface of a coat is decomposed and removed by the photo-semiconductot (C), there is also the effect that the water-wettability of the coat can be improved. This effect can be demonstrated regardless of a thickness of the coat or an amount of the photo-semiconductor (C) contained therein.

A commercial product of the photo-semiconductor (C) is available as powder or dispersion. Most of dispersions are aqueous dispersions, but some dispersions in organic solvent are also available. The photo-semiconductor dispersed in water is advantageous because it is aqueous and can thus be introduced as such into an emulsion. The photo-semiconductor (C) dispersed in non-aqueous organic solvent causes to lower emulsion stability aid can thus not be introduced as such into an emulsion. When the photo-semiconductor (C) dispersed in non-aqueous organic solvent is used as a reactive catalyst for hydrolyzable organosilanes represented by the above general formula (IV), to give a mixture of component (A) and the photo-semiconductor (C) dispersed in the non-aqueous organic solvent. By removing the organic solvent from this mixture, its emulsification as a mixture of component (A) and the photo-semiconductor (C) can be obtained. Further, in the photo-semiconductor (C) dispersed in water, tlne water present as a component other than solids can be used as a curing agent. for hydrolyzable organosilane represented by the above general formula (IV).

If the photo-semiconductor (C) is powder, its emulsion will be destroyed in a direct dispersion method using a conventional dyno-mill, paint shaker etc. to cause disadvantages such as phase separation, gelation, formation of precipitates etc. Accordingly, it is desirable to add a powdery base having the photo-semiconductor (C) powder dispersed (preferably at high concentration) in water with a dispersant to the emulsion and to stirrer it suitably. The powdery base may contain a wetting agent, a viscosity-controlling agent etc. in addition to the dispersant. One example of the dispersant includes, but is not limited to, a nonionic urethane acrylic block copolymer.

The method of dispersing the above powdery base is not particularly limited and may be a conventional dispersion method. Dispersing aids, coupling agents etc. can also be used in the dispersion process.

The photo-semiconductor (C) may have a metal carried on it. The metal which may be carried is not particularly limited, but the following maybe exemplified; gold, silver, copper, iron, zinc, nickel, cobalt, platinum, ruthenium, palladium, rhodium, cadmium etc., from which one or more metals can be suitably selected for use. By carrying metals, charge separation in the photo-semiconductor (C) is promoted to demonstrate the photo-catalytic action more effectively. The photo-semiconductor (C) with metals carried thereon has the oxidizing ability under light. This oxidization ability effects to demonstrate the deodorizing effect, antimicrobial effect etc.

An amount of carried metals is not particularly limited, but, for example, the amount is preferably 0.1 to 10% by weight, more referably 0.2 to 5% by weight relative to the photo-semiconductor (C). If the amount of carried metals is less than 0.1% by weight, there is the tendency that the effect of the carried metals cannot be sufficiently obtained. If the metal is carried in an amount exceeding 10% by weight, its effect does not increase and there may occur problems such as discoloration, deterioration in performance etc.

The method of carrying the metal includes, but is not limited to, an immersion method, an impregnation method, a photo-reducticn method etc.

A crosslinked clay body with photo-semiconductor (C) incorporated between layers may be used. By introducing photo-semiconductor (C) between layers, photo-semiconductor (C) is supported on fine particles to improve photo-catalytic performance.

An amount of photo-semiconductor (C) incorporated into the antifouling silicone emulsion coating-composition varies depending on the photo-catalytic performance of the photo-semiconductor (C), its desired effect, antifouling properties, utilities etc., but is preferably 5 to 80% by weight, more preferably 5 to 75% by weight relative to the total solid content of the coating composition. In an amount of less than 5% by weight, the photo-catalytic performance is low, and its antifouling properties may not be expected. If the amount exceeds 75% by weight, the proportion of the photo-semiconductor (C) in the applied coat is too high; the strength of the resulting coat may be lowered; the durable coat cannot be formed; the transparency of the coat may be lowered; and curing may be inhibited.

If the photo-semiconductor (C) is anatase type titanium oxide, the amount of the photo-semiconductor (C) incorporated is preferably at least 50% by weight to effectively demonstrate decomposition of organic materials, antimicrobial performance etc. The amount of the photo-semiconductor (C) may be less than 50% by weight in order to provide water-wetting properties with the cured applied coat to effectively demonstrate antifogging properties and antifouling properties by washing with rain water etc.

An amount of water used as component (D) (referred to hereinafter as "water (D)") in the composition of the present invention is not particularly limited. For example, its amount in the total amount of the composition is 50 to 90% by weight, more preferably 60 to 90% by weight. If the amount of water (D) is outside of the above range, disadvantages such as lowering of the stability of the resulting emulsion, generation of precipitates etc. tend to occur.

The composition of the present invention can also contain colloidal silica as necessary. The effect of colloidal silica is to give excellent coat-forming properties to the applied coat to increase the strength of the applied cured coat and the hardness of its surface.

A content of silica in the colloidal silica is not particularly limited, but, for example, the content is preferably 5 to 100% by weight, more preferably 15 to 80% relative to the partially hydrolyzed organosiloxane (A). If the silica content is less than 5% by weight, there is the tendency that desired coat strength cannot be obtained. If the content exceeds 100% by weight, the uniform dispersion of colloidal silica is made difficult. The partially hydrolyzed organosiloxane (A) may form gel or adversely affect the dispersibility of the photo-semiconductor (C), which may result in troubles such as aggregation and sedimentation of the photo-semiconductor (C).

The colloidal silica is not particularly limited, but, for example, silica dispersed in water or dispersed in non-aqueous organic solvent such as alcohol can be used. In general, such colloidal silica contains 20 to 50% by weight of silica as solid content. From this value, the amount of silica to be incorporated can be determined. The advantage of colloidal silica dispersed in water is that it is aqueous and can thus be introduced as such into an emulsion. Colloidal silica dispersed in non-aqueous organic solvent causes a reduction in emulsion stability and can not be introduced directly into an emulsion. When Colloidal silica dispersed in a non-aqueous organic solvent is used as a reactive catalyst for hydrolyzable organosilanes represented by the above general formula (VI) to give a mixture of component (A) andcolloidal silica dispersed in the non-aqueous organic solvent. By removing the organic solvent from this mixture, a mixture of component (A) and colloidal silica can be emulsified. In colloidal silica dispersed in water, the water present as a component other than solids can be used as a hardener for hydrolyzable organosilanes represented by the above general formula (IV).

The colloidal silica dispersed in water is prepared usually from water-glass or can also be easily obtained as a commercial product. The colloidal silica dispersed in an organic solvent can be easily prepared by replacing water in said colloidal silica dispersed in water by an organic solvent. In the same way as the colloidal silica dispersed in water, the colloidal silica dispersed in an organic solvent can also be easily obtained as a commercial product. Although the kind of the organic solvent in which colloidal silica is dispersed is not particularly limited, it is possible to use one or more kinds selected from the group consisting of lower aliphatic alcohols such as methanol, ethanol, isopropanol, n-butanol, isobutanol etc.; ethylene glycol derivatives such as ethylene glycol, ethylene glycol monobutyl ether, ethylene glycol monoethyl ether acetate etc.; diethylene glycol derivatives such as diethylene glycol, diethylene glycol monobutyl ether etc.; and diacetone alcohol etc. In combination with these hydrophilic organic solvents, it is also possible to use toluene, xylene, ethyl acetate, butyl acetate, methyl ethyl ketone, methyl isobutyl ketone, methyl ethyl ketoxime etc. Among these, lower aliphatic alcohols are preferable for easy desolvation.

The composition of the present invention may contain the above-described straight-chain polysiloxane diol containing hydroxyl groups at both terminals as component (E) (referred to hereinafter as "straight-chain polysiloxane diol containing hydroxyl groups at both terminals, (E)" or simply to "polysiloxane diol (E)"), if necessary. Polysiloxane diol (E) is a component to ensure low-temperature curing by promoting the curing of the composition and to improve the cracking resistance of an applied cured coat of the composition by giving rigidity (flexibility) on said coat.

In the above average formula (II) representing straight-chain polysiloxane diol containing hydroxyl groups at both terminals (E), $R^3$ is not particularly limited insofar as it is a monovalent hydrocarbon group. For example, the same groups described as $R^2$ in the above formula (I) can be used. Among the straight-chain polysiloxane diols having $R^3$, dimethyl siloxane diol and methyl phenyl siloxane diol are preferable because of no reduction in the weather resistance of the cured coat, improvement of the cracking resistance of the coat, and easy availability.

Because the straight-chain polysiloxane diol containing hydroxyl groups at both terminals (E) does not have any reactive group other than OH groups at the molecular terminals, its molecule is relatively poor in reactivity. Accordingly, the molecular terminals only of polysiloxane diol (E) in a cured coat are bound or not bound to compound (A). The main chain of the polysiloxane diol (E) has a two-dimensional structure and relatively readily moves, so it can absorb cure shrinkage resulting from crosslinkage of component (A) to prevent occurrence of cracking. Further, polysiloxane diol (E) can form a structure at low temperature as a crosslinking agent between component (A) molecules because hydroxyl groups at both terminals in polysiloxane diol (E) can bind relatively easily to OR groups in component (A). Accordingly, if polysiloxane diol (E) has hydroxyl groups meeting $OR^1$ groups in component (A), the curing of an applied coat at low temperature can further be assured. That is, polysiloxane diol (E) can achieve the 2 effects, that is, the effect of rendering the applied coat flexible and the effect of promoting the curing of the coat. These effects are the highest in the case of the polysiloxane diol (E) here "n" in the above formula (II) is in the range of $3:\leq n \leq 50$ (preferably $5;\leq n \leq 45$, more preferably $5 \leq n \leq 40$). The polysiloxane diol (E) has a structure of a straight-chain, thus readily absorbing cure stress and readily forming a network structure as a crosslinking agent. Higher "n" indicates higher effect as flexibilizer. If "n" is less than 3, there is no effect as flexibilizer. Lower "n" results in higher reactivity of the terminal —OH groups, so the effect as a curing agent is high. If "n" is more than 50, the reactivity of the terminal —OH groups becomes low, so the effect as a curing agent is low while its molecule tends to be larger, making its incorporation into component (A) impossible so that phase separation, whitening etc. in the coat may result.

An amount of polysiloxane diol (E) incorporated into the composition of the present invention varies depending on "n" and is not particularly limited, but, for example, its amount is preferably 1 to 70% by weight, more preferably 10 to 55% by weight relative to the component (A). If the amount is less than 1% by weight, it cannot form an adequate network structure as a crosslinking agent. If the amount is more than 70% by weight, unbound polysiloxane diol (E) readily causes disadvantages such as curing inhibition of the coat. A silicone emulsion coating composition-with high curing properties at low temperature and capable of forming a cured coat with resistance to racking can be provided by mixing a suitable amount of polysiloxane diol (E) ranging from high "n" to low "In".

The method of incorporating polysiloxane diol (E) into the composition of the present invention includes, but is not limited to, a method of incorporating component (E) before desolvation of component (A) or a method of incorporating component (E) after emulsification of component (E).

The composition of the present invention may contain at least one organic resin selected from the group consisting of alkyd resin, epoxy resin, acrylic resin, acrylic silicone resin, phenol resin, fluorine resin, polyester resin, chlorinated rubber resin, urethane resin and melamine resin.

These organic resins are a component which can give rigidity (flexibility) to an applied cured coat of the composition of the present invention to improve the cracking-resistance of the coat. Since the compatibility between the silicone resin that is an essential component of the composition of the present invention and the above organic resin is generally poor in an organic solvent system, there easily occur phase separation in solution and whitening in the applied coat. In an emulsion system, however, these components can be present as emulsion particles respectively, and thus the above problems hardly occur. Accordingly, the method of incorporating said organic resin into the composition of the present invention is preferably a method in which said organic resin previously emulsified is mixed with an emulsion of the composition of the present invention.

When the composition of the present invention contains the resins, its amount is not particularly limited, but varies depending on the kind of resin within the range in which curing of component (A) is not inhibited and desired flexibility is given. For example, the amount of organic resin is in the range of 1 to 50% by weight, more preferably 5 to 20% by weight relative to component (A). If the amount is less than 1% by weight, sufficient flexibility may not be achieved. If the amount is more than 50% by weight, curing of component (A) may be inhibited and durability of the applied and cured coat may lowered due to the progress of coat decomposition and deterioration caused by the photo-catalytic action of the photo-semiconductor (C).

If the composition of the present invention containing said organic resin as an additional component is used to form an applied and cured coat on the surface of a member used in the outdoor environment in which it is exposed to natural light, said organic resin is preferably acrylic resin (referred to hereinafter as "acrylic resin (F)") described above as component (F).

Acrylic resin (F) has the effect of improving the rigidity of an applied cured coat of the composition of the present invention, thereby cracking is prevented and coat thickening is made possible. Acrylic resin (F) is used for acrylic modification of a condensed and crosslinked product of component (A) forming a three-dimensional skeleton of an applied and cured coat of the composition of the present invention by incorporation of acrylic resin (F) into said condensed crosslinked product. The acrylic modification of said condensed crosslinked product improves adhesion of the applied and cured coat of the composition of the present invention to a substrate therefor.

The acrylic resin (F) is excellent in compatibility with the component (A). Emulsification can be made possible after mixing thereof. In the resulting emulsion, components (A) and (F) are present as emulsion particles of a mixture (acrylic modified product) thereof. An applied cured coat of the silicone emulsion coating-composition containing such emulsion particles is superior in flexibility, durability, adherence etc. to an applied cured coat of the silicone emulsion coating-composition obtained by mixing individual independent emulsions of (A) and (F).

The first (meth)acrylate as one of the component monomers of acrylic resin (F) is at least one of compounds represented by formula (III) wherein $R^5$ is a substituted or unsubstituted C1 to C9 monovalent hydrocarbon group, which is exemplified by alkyl groups such as a methyl group, an ethyl group, a n-propyl group, an i-propyl group, an n-butyl group, an i-butyl group, a sec-buityl group, a tert-butyl group, a pentyl group, a hexyl group, a heptyl group, an octyl group etc.; cycloalkyl groups such as a cyclopentyl group, a cyclohexyl group etc.; aralkyl groups such as a 2-phenylethyl group, a 2-phenylpropyl group, a 3-phenylpropyl group etc.; aryl groups such as a phenyl group, a tolyl group etc.; halogenated hydrocarbons such as a chloromethyl group, a γ-chloropropyl group, a 3,3,3-trifluoropropyl group etc.; and hydroxy hydrocarbon groups such as a 2-hydroxyethyl group etc.

The second (meth)acrylate as another component monomer of acrylic resin (F) is at least one of compounds represented by formula (III) wherein $R^5$ is an epoxy group, a glycidyl group, and a hydrocarbon group containing an epoxy group and/or a glycidyl group (e.g. γ-glycidoxypropyl group etc.).

The third (meth)acrylate as other component monomer of acrylic resin (F) is one of compounds represented by formula (III) wherein $R^5$ is a hydrocarbon group containing an alkoxysilyl group and/or a halogenated silyl group, such as, a trimethoxysilyl propyl group, a dimethoxymethylsilyl propyl group, a monomethoxydimethylsilyl propyl group, a triethoxysilyl propyl group, a diethoxymethylsilyl propyl group, an ethoxydimethylsilyl propyl group, a trichlorosilyl propyl group, a dichloromethylsilyl propyl group, a chlorodimethylsilyl propyl group, a chlorodimethoxysilyl propyl group, a dichloromethoxysilyl propyl group etc.

The acrylic resin (F) is a copolymer of at least three kinds of (meth)acrylates comprising at least one of the first (meth) acrylate, at least one of the second (meth)acrylate and at least one of the third (meth)acrylate. The copolymer may further contain at least one monomers selected from the first, second and third (meth)acrylates or other (meth)acrylates.

The first (meth)acrylate is a component for improving the rigidity of the applied cured coat of the composition of the present invention. For this purpose, the substituted or unsubstituted group $R^5$ preferably has a large volume, and thus the number of its carbon atoms is preferably 2 or more.

The second (meth)acrylate is a component for improving the adherence of the coated and cured coat, of the composition of the present invention to the substrate.

The third (meth)acrylate forms chemical bonds between the acrylic resin (F) and the component (A) at the time of curing of the composition of the present invention. Thereby, acrylic resain (F) is fixed in the applied cured coat. Further, the third (meth) acrylate has an additional effect of improving compatibility of the acrylic resin (F) with the component (A). The molecular weight of acrylic resin (F) depends greatly on the compatibility between the acrylic resin (F) and the component (A). Accordingly, the acrylic resin (F) has a weight-average molecular weight preferably in the range of 1,000 to 50,000, more preferably 1,000 to 20,000 as determined by a polystyrene calibration curve. If the weight-averagemolecular weight of acrylic resin (F) exceeds 50,000, phase separation occurs and the resulting coat may be whitened. If the molecular weight is less than 1,000, the rigidity of the coat is lowered and cracks tend to occur easily.

An amount of the second (meth)acrylate is preferably 2% or more in terms of the monomer molar ratio in the copolymer. If the amount is less than 2%, the adherence of the resulting coat tends to be poor.

An amount of the third (meth)acrylate is preferably in the range of 2 to 50% in terms of the monomer molar ratio in the copolymer. If the amount is less than 2%, the compatibility between the acrylic resin (F) and the component (A) is poor, and the resulting coat may be whitened. If the amount is more than 50%, the bond density between acrylic resin (F) and component (A) tends to be too high to improve the rigidity inherent in acrylic resin itself.

The method of synthesizing acrylic resin (F) includes, but is not limited to, radical polymerization by conventional solution polymerization, emulsion polymerization and suspension polymerization in an organic solvent, or anionic polymerization and cationic polymerization. A known radical polymerization method by solution polymerization may be adopted. For example, the first, second and third (meth) acrylate monomers are dissolved in an organic solvent in a reaction vessel, and further a radical polymerization initiator is added. The mixture is reacted in a nitrogen stream under heating. Said organic solvent is exemplified by, but is not limited to, toluene, xylene, ethyl acetate, butyl acetate, methyl ethyl ketone, methyl isobutyl ketone, ethylene glycol monobutyl ether, diethylelae glycol monobutyl ether, acetate ethylene glycol monoethyl ether etc. The radical polymerization initiator is exemplified by, but is not limited to, cumene hydroperoxide, tertiary butyl hydroperoxide, dicumyl peroxide, di-tert-butyl peroxide, benzoyl peroxide, acetyl peroxide, lauroyl peroxide, azobisisobutyronitrile, hydrogen peroxide-$Fe^{2+}$ salt, persulfate-$NaHSO_3$, cumene hydroperoxide-$Fe^2+$ salt, benzoyl peroxide-dimethyl aniline, peroxide-triethyl aluminum etc. To control the molecular weight, a chain transfer agent may also be added. The chain transfer agent is exemplified by, but is not limitedto, quinones such as monoethyl hydroquinone, p-benzoquinone etc.; thiols such as mercaptoacetic acid-ethyl ester, mercaptoacetic acid-n-butyl ester, mercaptoacetic acid-2-ethyl hexyl ester, mercaptocyclohexane, mercaptocyclopentane, 2-mercaptoethanol etc.; thiophenols such as di-3-chlorobenzene thiol, p-toluene thiol, benzene thiol etc.; thiolderivatives such as γ-mercaptopropyltrimethoxysilane etc.; phenyl picryl hydrazine; diphenyl amine; and tertiary butyl catechol.

The composition of the present invention may contain a water-insoluble organic solvent depending on, for example, necessity for improvement in stability of the molecular weight of the partially hydrolyzed organosiloxane (A) in emulsion particles. The water-insoluble organic solvent which may be used is not particularly limited, but solvents with solubility of 1 g or less/100 g water at 25° C. maybe used. Such a solvent is exemplified by benzene, toluene and xylene etc. If such water-insoluble organic solvents are used, its amount is within the range in which environmental problems etc. are not caused, for example preferably in the range of 0 to 20% by weight, more preferably 0 to 10% by weight relative to the total amount of the composition.

If necessary, the composition of the present invention may contain a thickening agent, a protective colloid agent etc. which are usually added to improve emulsion stability.

The protective colloid agent can be used not only as a surface active agent but also as a thickening agent.

The above thickening agent or protective colloidal agent is exemplified by, but is not limited to, celluloses such as hydroxyethyl cellulose, hydroxypropyl cellulose, hydroxypropyl methyl cellulose, carboxymethyl cellulose etc.; polysaccharidtes such as guar gum, locust bean gum etc.; animal proteins such as gelatin, casein etc.; and water-soluble polymeric compounds such as soluble starch, alginates, polyvinyl alcohols, sodium polyacrylates etc.

A nonionic urethane acrylic block copolymer may also be used as a thickening agent. The nonionic urethane acrylic block copolymer shows an ability to associate with emulsion particles to form a very uniform network of a thickening agent with an emulsion of the composition of the present invention. Thereby, the stability of the emulsion is improved while excellent flow properties, leveling properties and thick-coat properties can be given to the composition of the present invention. Such nonionic urethane acrylic block copolymer is easily available as a commercial product. If the composition of the present invention contains the nonionic urethane acrylic block copolymer, its amount is not particularly limited, but, for example, it is preferably 0.1 to 10% by weight, more preferably 1 to 5% by weight relative to the component (A). If the amount is less than 0.1% by weight, the above network may not sufficiently be formed. If the amount is more than 10% by weight, the weather resistance of the cured coat may be lost.

The color of the composition of the present invention may be controlled by further incorporating coloring agents such as pigment, dye etc. if necessary. The coat performance of the applied cured coat formed of the composition of the present invention is hardly lowered even if it contains coloring agents.

The pigment which can be used is not particularly limited, but for example, it is possible to employ one or more compounds selected from the group consisting of organic pigments such as carbon black, quinacridone, naphthol red, cyanine blue, cyanine green, Hansa yellow etc.; and inorganic pigments such as titanium oxide, barium sulfate, red oxide, complex metal oxides etc.

In the method of dispersing the pigment, if the pigment powder is directly dispersed by a usual dyno-mill, paint shaker etc., there may occur disadvantages such as emulsion destruction, phase separation, gelation, precipitation etc. Accordingly, it is desired that a pigment base having the pigment dispersed (preferably at high concentration) in water with a dispersant is added to the emulsion and suitably stirred. The pigment base can be easily obtained as a commercial product. The pigment base may contain a wetting agent, a viscosity-controlling agent etc. besides the dispersant. One example of the dispersant includes, but is not limited to, the above nonionic urethane acrylic block copolymer.

The method of dispersing the pigment base is not particularly limited and a conventional dispersion method can be used. For dispersion, dispersion aids, coupling agents etc. may also be used.

The amount of the pigment incorporated into the composition of the present invention is not particularly limited because its shielding properties vary depending on the kind of pigment, but for example, its amount is preferably 5 to 100% by weight, raore preferably 5 to 80% by weight relative to the total mount of components (A), (B) and (C). If the amount of the pigment is Less than 5% by weight, its shielding properties tend to become poor.

If its mount exceeds 100% by weight, the smoothness of the resulting coat may become poor or the strength of the cured coat maybe lowered.

The dye which can be used in controlling the color of the composition of the present invention includes, but is not limited to, dyes such as azo type, anthraquinone type, indigoid type, sulfide type, triphenyl methane type, xanthene type, alizarin type, acridine type, quinoneimine type, thiazole type, methine type, nitro type, nitroso type etc. One dye or a combination of two of more dyes selected from this group can be used.

In the composition of the present invention, an amount of the dye is not particularly limited because its coloring properties vary depending on the kind of dye, but for example, its amount is preferably 0.1 to 50% by weight, more preferably 1 to 40% by weight relative to the total-amount of components (A), (B) and (C). If the amount of the dye is less than 0.1% by weight, its coloring properties tend to be lowered. If the amount is more than 50% by weight, durability of the cured coat may become poor or the strength of the cured coat may be lowered.

The composition of the present invention may contain other ingredients such as leveling agent, metal powder, glass powder, antimicrobial agent (preferably inorganic antimicrobial agent:), antioxidant, antistatic agent, UV absorber, defoaming agent, anti-fungal agent etc. in an amount not to adversely affect the present invention.

As the composition of the present invention can be cured at a low temperature or cured by heating without a curing agent, it does not requires a curing catalyst. The curing catalyst may, however, be further incorporated depending on the object of promoting the thermal curing of an applied coat or curing the coat at room temperature by promoting the condensation reaction of the partially hydrolyzed organosiloxane (A). The curing catalyst is exemplified by, but is not limited to, alkyl titanates; metal carboxylates such as tin laurate, tin octylate, iron octylate, lead octylate, dibutyltin dilaurate and dioctyltin dimaleate; amine compounds such as n-hexyl amine, guanidine and hydrochlorides thereof; amine carboxylates such as dibutylamine-2-hexoate, dimethylamine acetate and ethanolamine acetate; quaternary ammonium carboxylates such as tetramethyl ammonium acetate; amines such as tetraethylpentamine; amine type silane coupling agents such as N-β-aminoethyl-γ-aminopropyltrimethoxy silane and N-β-aminoethyl-γ-aminopropylmethyldimethoxy silane; acids such as p-toluene sulfonic acid, phthalic acid and hydrochloric acid; aluminum compounds such as aluminum alkoxide and aluminum xylate; alkali metal salts such as lithium acetate, potassium acetate:, lithium formate, sodium formate, potassium phosphate and potassium hydroxide; titanium compounds such as tetraisopropyl titanate, tetrabutyl titanate and titanium tetracetyl acetonate; and halogenated silanes such as methyl trichlorosilane, dimethyl dichlorosilane and trimethyl monochlorosilane. However, any other components may also be used if they can promote condensation reaction of the partially hydrolyzed organosiloxane (A). These curing catalysts are preferably formed into an emulsion by use of the surface active agent (B) and water (D) in a usual manner prior to use.

The method of coating the composition of the present invention is not particularly limited, but for example, it is possible to select a wide variety of conventional coating methods such as brushing, spraying, immersion (dipping), bar, flowing, rolling, curtain, knife coating, spin coating etc.

If the composition of the present invention is diluted, dilution with water is preferable. However, in order to regulate the leveling properties or dryness of the coat face and to improve the stability of the silicone emulsion coating-composition, it is possible to add to the composition a small amount of organic solvent, for example, Cellosolve types such as ethylene glycol monomethyl ether, ethylene glycol monoethyl ether, ethylene glycol monobutyl ether etc.; propylene glycol ether types such as propylene glycol monomethyl ether, propylene glycol monoethyl ether etc.; Carbitol types such as diethylene glycol monoethyl ether, diethylene glycol monobutyl ether etc.; triglycol ether types such as triethyliene glycol monomethyl ether, tripropylene glycol monomethyl ether etc.; acetyl acetone, methyl ethyl amine, diethanol amine etc.

The method of curing the composition of the present invention applied on a substrate may be any method known in the art and is not particularly limited. The temperature for curing is not particularly limited, and a temperature in a wide range from room temperature to heating temperature may be selected depending on the desired performance of the applied cured coat, the presence or absence of a curing catalyst, and thermal resistance of the photo-semiconductor (C) or a substrate.

The thickness of a coat (cured coat) formed from the composition of the present invention is not particularly limited, but is preferably about 0.1 to 50 $\mu$m, more preferably 1 to 20 $\mu$m so that the coat can be stably stuck and kept for a prolonged period of time without cracking, repelling etc.

The process for producing the composition of the present invention is not particularly limited, but for example, the composition can be produced by mixing the components (A), (B), (C) and (D) under stirring. The stirring method, or the so called an emulsification method is not particularly limited and it is possible to use any methods known in the art, e.g. an emulsification method using an emulsifier such as a homogenizer, a homomixer etc. In this step, the order of mixing the components (A), (B), (C) and (D) is not particularly limited. For example, the components (A), (C) and (D) are uniformly mixed, then the component (B) or the components (B) and (D) are added thereto, and the mixture is emulsified by said emulsifier.

The process for producing the composition of the present invention is not limited to the method described above. For example, any of the first to third production processes of the present invention can be used.

The first production process comprises forming an emulsion of the components (A), (B) and (D) and then adding the component (C) to give the antifouling silicone emulsion coating-composition. This method is advantageous where the amount of component (C) added is suitably determined for required photo-catalytic performance. When the organic solvent in component (A) is removed, a surface active agent may be previously been added before removal. This surface active agent is used to prevent polymerization of the partially hydrolyzed organosiloxane (A). The details are described below in the second production process of the present invention.

In the second production process of the present invention, an organic solvent-containing mixture of the component (A), a part of the component (B) and the component (C) is subjected to desolvation for removal of said organic solvent to give a desolvated material. This desolvated material is mixed with the components (B) and (D) to give the antifouling silicone emulsion coating-composition.

In the second production process, the organic solvent to be removed from the mixture of the component (A), a part of the component (B) and the component (C) is an alcohol formed as a by-product in hydrolysis reaction of the hydrolyzable organoalkoxysilane in the case where the hydrolyzable organoalkoxysilane is used as the starting material of component (A), or is the organic solvent etc. contained in the photo-semiconductor (C) (i.e. component (C)) dispersed in the organic solvent. For easiness of desolvation, $R^1$ in the hydrolyzable organoalkoxysilane is preferably a lower alkyl group, and the organic solvent contained in the photo-semiconductor (C) dispersed in the organic solvent is preferably a lower aliphatic alcohol.

As the desolvation method for removal of the organic solvent, it is possible to use a method of removing the organic solvent under conditions using heating/normal pressure, normal temperature/reduced pressure or heating/reduced pressure. Preferably, removal of the organic solvent by heating at a temperature as low as possible under reduced pressure is desired for inhibition of polymerization. For the purpose of inhibiting reactivity during the period of from removal of the solvent from the component (A)-containing solution to emulsification in the first production process and during the period of from removal of the solvent from the component (A)-containing solution or the mixture of components (A) and (C) to emulsification in the second production process and for the purpose of maintaining the curea performance of a cured coat, the samer surface active agent (B) as above-described may be used if necessary. For those purposes, it is also possible to use the ones with an HLB of 5.0 to 20.0 depending on the kind of solvent removed. If the value of HLB is outside of this range, the effect of inhibiting polymerization is not demonstrated, and further the polymerization may also be promoted. However, if a surface active agent with an HLB of less than 9 is used, the average HLB of the total surface active agent contained in the finally obtained antifouling silicone emulsion coating-composition of the present invention should be regulated to be 9 or more.

For preparation of the antifouling silicone emulsion coating-composition of the present invention, when a surface active agent is used for inhibition of polymerization, the same kind of surface active agent is preferably used throughout the step of its preparation.

An amount of the surface active agent for the purpose of inhibiting polymerization is 1 to 30% by weight, preferably 2 to 15% by weight relative to the component (A). If the amount is less than 1% by weight, its effect cannot be seen. If the amount is more than 30% by weight, the curing properties and weather, resistance of the resulting coat are deteriorated. The above-mentioned content of the surface active agent (B) contained in the antifouling silicone emulsion coating-composition of the present invention refers to a content including the surface active agent used for inhibiting polymerization, and the content is regulated such that the amount of the total surface active agents falls under the range.

The third production process of the present invention comprises mixing the hydrolyzable organosilane of the above formula (IV), powder of photo-semiconductor (C) and/or a dispersion thereof, and water (D) (a catalyst such as acid, base etc. can be added if necessary). The hydrolyzable organosilane is partially hydrolyzed with water (D) (when a catalyst such as acid, base etc. is added in the above mixing step, this partial hydrolysis is promoted by its action) to give the partially hydrolyzed organosiloxane (A). A mixture containing the partially hydrolyzed organosiloxane (A) and the photo-semiconductor (C) is obtained. Thereafter, this mixture and the surface active agent (B) are mixed. If water (D) does not remain at all or does not remain in a necessary amount in the above step, water (D) is added to give the antifouling silicone emulsion coating-composition.

The dispersion of the semiconductor (C) powder used in the third production process can use a dispersion of photo-semiconductor (C) powder in water and/or in an organic solvent.

Examples of hydrolyzable organosilanes of the above general formula (IV) used in the third production process are exemplified by, but are-not limited to, the hydrolyzable organoalkoxysilanes etc. described as the starting materials of the partially hydrolyzed organosiloxane (A).

In the third production process, the amount of water (D) used in mixing the hydrolyzable organosilane of the above formula (IV) and the photo-semiconductor (C) powder and/or a dispersion thereof with water (D) is not particularly limited, but for example, its amount is preferably 0.3 to 2.0 moles, more preferably 0.4 to 1.0 mole per mole of $OR^1$ group in the hydrolyzable organosilane. If the photo-semiconductor (C) dispersed in water is used as a dispersion of photo-semiconductor (C) powder, said molar amount of water (D) is an amount including the water present as a component other than solids in the photo-semiconductor (C) dispersed in water. If the photo-semiconductor (C) dispersed in an organic solvent is used as the dispersion of the photo-semiconductor (C) powder, the step of removing the solvent is necessary later. If the molar amount of water (D) is less than 0.3 mole, a low-molecular-weight silicone compound in molecular-weight distribution of the partially hydrolyzed organosiloxane (A) tends to be removed along with the organic solvent in the organic solvent desolvation. On the other hand, if the molar amount of water (D) exceeds 2.0 moles, the storage stability of the partially hydrolyzed organosiloxane (A) may be lowered to cause gelation.

If the desolvation step is required as described above in the third production process, the same desolvation method as described in the second production process can be used. In the third production process, a surface active agent may be used if necessary. The object of its use, specific examples and amount of the surface active agent are also the same as described in the second production process.

When the hydrolyzed organosiloxane, the photo-semiconductor (C) powder and/or a dispersion thereof are mixed with water (D) in the third production process, pH adjustment may be conducted, if necessary.

A substrate (which is also a substrate used in the coated article of the present invention) to which the composition of the present invention is applied is not particularly limited, but for examples, the following is exemplified; inorganic substrates, organic substrates, inorganic/organic composite substrates, and coated substrates having at least one layer of an inorganic coat and/or at least one layer of an organic coat on the surface of any of the above substrates.

Examples of inorganic substrates include, but are not limited to, metallic substrates; glass substrates; enamel; inorganic building materials such as water-glass decorative laminated sheets, inorganic cured bodies etc.; ceramics etc.

Examples of metallic substrates include, but are not limited to, non-iron metals [e.g. aluminum (JIS-H4000 etc.), aluminun alloys (duralumin etc.), copper, zinc etc.], iron, steel [e.g. rolled steel (JIS-G3101 etc.), molten zinc-plated copper (JIS-G3302 etc.), stainless steel (rolled) (JIS-G4304, G4305 etc.) eta.], tin plate (JIS-G3303 etc.), and other general metals (including alloys).

Examples of glass substrates include, but are not limited to, sodium glass, Pyrex glass, quartz glass, non-alkali glass etc.

Said enamel comprises a glass enamel agent baked and applied on the surface of a metal. Its base metal includes, but is not limited to, soft steel plate, steel plate, cast iron, aluminum etc The enamel agent may be conventional one and is not particularly limited.

Said water-glass decorative laminated sheet indicates a decorative laminated sheet et. having sodium silicate applied and baked on a cement material such as slate.

Examples of said inorganic cured bodies include, but are not limited to, general substrates produced by curing and molding of inorganic materials such as fiber-reinforced cement plate (JIS-A5430 etc.), ceramic siding (JIS-A5422 etc.), woodwool cement plate (JIS-A5404 etc.), pulp cement plate (JIS-A5414 etc.), slate/wood wool cement laminate (JIS-A5426 etc.), gypsum board article (JIS-A6901 etc.), clay tile (JIS-A5208 etc.), thick slate (JIS-A5402 etc.), ceramic tile (JIS-A5209 etc.), building concrete block (JIS-A5406 etc.), terrazzo (JIS-A5411 etc.), pre-stressed concrete doubleT slab (JIS-A5412 etc.), ALC panel (JIS-A5416 etc.), hollow pre-stressed concrete panel (JIS-A6511 etc.), normal brick (JIS-R1250 etc.).

As a conventional silicone coating is easily corroded by an alkali component eluted from the water-glass decorative laminated sheet and the inorganic cured body, long-term durability cannot be obtained. Preliminary sealing of the substrate is previously required. But the antifouling silicone emulsion coating-composition of the present invention is characterized by its long-term durability because it is hardly corroded by an alkali component because of the incorporated surface active agent (B).

The ceramics substrates include, but are not limited to, alumina, zirconia, silicon carbide, silicon nitride etc.

The organic substrates include, but are not limited to, plastic, wood, wood materials, paper etc.

The plastic substrates include, but are not limited to, thermosetting or thermoplastic plastics such as polycarbonate resin, acrylic resin, ABS resin, vinyl chloride resin, epoxy resin, phenol resin etc. and fiber-reinforced plastics (FRP) having these plastics reinforced with organic fibers such as nylon fibers etc. As the composition of the present invention is aqueous and contains a low amount of organic solvent, it can also be applied to a substrate such as plastic relatively readily corroded by an organic solvent The fogging effect, dirt-preventing effect etc. on the surface are obtained.

The inorganic/organic composite substrates include, but are not limited to, fiber-reinforced plastic (FRP) having the above plastic reinforced with inorganic fibers such as glass fiber, carbon fiber etc.

The organic coats constituting said applied substrates include, but are not limited to, cured coats etc. of coating materials containing organic resins such as acrylic type, alkyd type, polyester type, epoxy type, urethane type, acrylic silicone type, chlorinated rubber type, phenol type, melamine type etc.

The inorganic coats constituting said coated substrates include, but are not limited to, cured coats of coating materials containing inorganic resin such as silicone resin etc.

When the composition of the present invention is applied to a substrate, there are some cases where adhesion is hardly obtained depending on the materials of the substrate or the state of its surface when the composition of the present invention is applied as such. Therefore, a primer layer may be formed if necessary before an applied cured coat of the composition of the present invention is formed. The primer layer may be organic or inorganic and is not particularly limited, but an example of the organic primer layer is a cured resin layer of an organic primer composition containing at least 10 weight-% solid of at least one organic resin selected from the group consisting of nylon resin, alkyd resin, epoxy resin, acrylic resin, organic modified silicone resin (e.g. acrylic silicone resin etc.), chlorinated rubber resin, urethane resin, phenol resin, polyester resin and melamine resin. An example of the inorganic primer layer is a cured resin layer etc. of an inorganic primer composition containing at least 90 weight-% solid of inorganic resin such as silicon resin etc.

A thickness of the primer layer is not particularly limited, but for example, its thickness is preferably 0.1 to 50 μm, more preferably 0.5 to 10 μm. If its thickness is too thin, adherence may not be obtained. If it is too thick, foaming etc. may occur at the time of drying.

A substrate having at least one layer of the above organic primer layers and/or inorganic primer layers on the surface thereof is included in the category of the above applied substrates. That is, the above coat on the surface of said applied substrate may be said primer layer.

The form of the substrate is not particularly limited, but for example, may be in the form of a film, sheet, plate, fiber etc. Further, the substrates may be molded bodies of such shaped materials, or bodies provided partially with at least one of such molded bodies.

The substrate may be made of one of the above-described materials or a composite material consisting of at least two of the above-described materials or a laminate composed of at least two of the above-described materials.

The composition and coated articles of the present invention demonstrate excellent antifouling performance stably for a prolonged period of time and lowering of dirt-adhesion. Even if dirt adheres thereto, it is readily removed. Because of these effects, an applied cured coat of the composition of the present invention may be used preferably for the following utilities by providing it on at least a part of various materials or articles.

Building-related members or articles, or exterior materials (e.g., outside wall materials and tiles such as flat tile, Japanese tile, metallic tile etc.), gutters, for example resin gutters such as vinyl chloride gutters and metallic gutters such as stainless steel gutters etc., gates and members used therefor (e.g. gate doors, gateposts, gate walls etc.), fences and members used therefor, garage doors, home terraces, doors, poles, carports, bicycle ports, sign posts, delivery posts, wiring devices such as control panels, switches etc., gas meters, intercoms, television door phones and camera lens, electric keys, entrance poles, passageway decks, ventilation-fan openings, building glasses etc.; windows (e.g. windows for lightning, skylights, opening and closing windows such as louvered windows etc.) and members used therefor (e.g. window frames, shutters, blinds etc.), automobiles, trains, airplanes, ships, mechanical apparatus, members around the road (e.g. sound-proof walls, tunnel interior plates, various indicators, guard rails, buffer stops, high railings, traffic signals and poles for signal, signals, post cones etc.), advertising towers, outdoor or indoor lightning devices and members used therefor (e.g. glass members, resin members, metallic members, ceramic members etc.), glasses for solar batteries, agricultural vinyl chloride and glass houses, outdoor apparatuses for air conditioners, and antenna for VHF/UHF/BS/CS etc.

The composition of the present invention may be directly applied and cured on at least a part of the above-described materials or articles, but there is no limitation to its use. For example, a coat of the composition of the present invention is applied onto the surface of a film substrate and cured to give an antifouling coat. The resultant film may then be attached to at least a part of the above-described materials or articles. The materials of such film substrates include, but are not limited to, polyethylene terephthalate (PET) resin, polybutylene terephthalate (PBT) resin, vinyl chloride resin, acrylic resin, fluorine resin, polypropylene (PP) resin and a composite resin thereof.

EXAMPLES

Hereinafter, the present invention is described in detail with reference to Examples and Comparative Examples. In Examples and Comparative Examples, "parts" and "%"

mean "parts by weight" and "% by weight" respectively unless otherwise specified. The molecular weight was determined in an measuring apparatus HLC8020 (Tosoh) by GPC (gel permeation chromatography) after a calibration curve of standard polystyrene was prepared. It should be noted that the present invention is not limited to the following examples.

Before Examples and Comparative Examples, the respective components used therein were prepared in the following manner.

First, a preparation example of Component (A) is described.

Preparation Example A-1

One thousand (1000) parts of water and 50 parts of acetone were introduced into a flask equipped with a stirrer, a heating jacket, a condenser, a dropping funnel and a thermometer. A solution of 44.8 parts (0.3 mol) of methyltrichlorosilane, 38.7 parts (0.3 mol) of dimethyldichlorosilane and 84.6 parts (0.4 mol) of phenyltrichlorosilane in 200 parts of toluene was added dropwuise to the flask under stirring and hydrolyzed at 60° C. After forty (40) minutes passed after the addition was finished, stirring was stopped. The reaction solution was transferred to a separatory funnel and left to be separated into two layers. The aqueous hydrochloric acid in the lower layer was removed, and then the water and hydrochloric acid remaining in the solution of the organopolysiloxane in toluene as the upper layer were distilled off with excess toluene by stripping under reduced pressure. Thereby, a 50% toluene solution of the reactive molecule-terminated silanol group-containing organopolysiloxane was obtained.

A solution of 0.6 part of dibutyltin laurate and 10 parts of toluene was added dropwise under stirring to a mixed solution of 100 parts of the above solution, 5 parts of methyltrimethoxysilane and 5 parts of dimethyldimethoxysilane, so that alkoxylation of the silanol group was conducted at 60° C. After 40 minutes passed after the drop wise addition was finished, stirring was stopped, and the dibutyltin dilaurate and methanol were distilled off with excess toluene. Thereby, a 80% toluene solution of the partially hydrolyzed organosiloxane with a weight-average molecular weight of 2,000 was obtained. This is referred to as A-1. The average formula of the resulting partially hydrolyzed organosiloxane corresponds to $R^2aSiOb(OR^1)c(OH)d$.

Preparation Example A-2

Seventy (70) parts of methyltrimethoxysilane, 30 parts of dimethyldimethoxysilane and 30 parts of tetraethoxysilane were mixed and then diluted with 28.3 parts of isopropyl alcohol, followed by adding a solution prepared by diluting 7.2 parts of 0.01 N hydrochloric acid with 40 parts of water. The mixture was hydrolyzed at room temperature under stirring. The resulting solution was heated in a thermostatic chamber at 60° C., to give a 30% mixed alcohol solution of the partially hydrolyzed organosiloxane with a weight-average molecular weight of 1,500. This is referred to as A-2. The average formula of the resulting partially hydrolyzed organosiloxane corresponds to $R^2aSiOb(OR^1)c(OH)d$.

Preparation Example A-3

Fifty (50) parts of titanium oxide dispersed in methanol (Queen Titanic 11-1020G(c) with a solid content of 20% and an average primary particle diameter of 5 nm, a product of Shokubai Kasei K.K.) were added as a photo-semiconductor to 100 parts of methyltrimethoxysilane and then diluted with 10.3 parts of methanol, followed by adding a solution prepared by diluting 7.2 parts of 0.01 N hydrochloric acid with 30 parts of water. The mixture was hydrolyzed under stirring at room temperature. The resulting solution was heated in a thermostatic chamber at 60° C., to give a 30% methanol solution of the titanium oxide-mixed partially hydrolyzed organosiloxane with a weight-average molecular weight of 1,000. This is referred to as A-3. The average formula of the resulting partially hydrolyzed organosiloxane corresponds to $R^2aSiOb(OR^1)c(OH)d$.

Preparation Example A-4

Forty (40) parts of acidic colloidal silica dispersed in water (Snowtex O(c) with a solid content of 20%, a product of Nissan Kagaku Kogyo K.K.) and 40 parts of organosilica sol (acidic colloidal silica) dispersed in methanol (MA-ST (c) with a solid content of 30%, a product of Nissan Kagaku Kogyo K.K.) were mixed with 100 parts of methyltrimethoxysilane and then diluted with 51 parts of methanol. The mixture was hydrolyzed under stirring at room temperature. The resulting solution was heated in a thermostatic chamber at 60° C., to give a 30% methanol solution of the colloidal silica-mixed partially hydrolyzed organosiloxane with a weight-average molecular weight of 1,600. This is referred to as A-4. The average formula of the resulting partially hydrolyzed organosiloxane corresponds to $R^2aSiOb(OR^1)c(OH)d$.

Preparation Example A-5

Seventy (70) parts of methyltrimethoxysilane, 30 parts of dimethyldimethoxysilane and 30 parts of tetraethoxysilane were mixed and then diluted with 48.3 parts of isopropyl alcohol, followed by adding a solution prepared by diluting 7.2 parts of 0.01 N hydrochloric acid with 20 parts of water. The mixture was hydrolyzed at room temperature-under stirring. The resulting solution was heated in a thermostatic chamber at 60° C., to give a 30% mixed alcohol solution of the partially hydrolyzed organosiloxane with a weight-average molecular weight of 680. This is referred to as A-5. The average formula of the resulting partially hydrolyzed organosiloxane corresponds to $R^2aSiOb(OR^1)c(OH)d$.

Preparation Example A-6

One thousand (1000) parts of water and 50 parts of acetone were introduced into a flask equipped with a stirrer, a heating jacket, a condenser, a dropping funnel and a thermometer A solution of 44.8 parts (0.3 mol) of methyltrichorosilane, 38.7 parts (0.3 mol) of dimethyldichlorosilane, 84.6 parts (0.4 mol) of phenyltrichiorosilane and 200 parts of toluene were added dropwise to the flask under stirring and hydrolyzed at 60° C. After 1 hour passed after the addition was finished, stirring was stopped. The reaction solution was transferred to a separatory funnel and left to be separated in to two layers. The aqueous hydrochloric acid in the lower layer was separated to be removed, and then the water and hydrochloric acid remaining in the organopolysiloxane solution in toluene as the upper layer were distilled off along with excess toluene by stripping under reduced pressure. Thereby, a 50% toluene solution of the reactive molecule-terminated silanol group-containing organopolysiloxane was obtained.

A solution of 0.6 part of dibutyltin laurate and 10 parts of toluene was added dropwise under stirring to a mixed solution of 100 parts of the above solution, 5 parts of methyltrimethoxysilane and 5 parts of dimethyldimethoxysilane, so that alkoxylation of the silanol group was conducted at 60° C. After 40 minutes passed after the dropwise addition was finished, stirring was stopped, and the dibutyltin dilaurate and methanol were distilled off with excess toluene. Thereby, a 80% mixed toluene solution of the partially hydrolyzed organosiloxane with a weight-average molecular weight of 4,500 was obtained. This is referred to as A-6. The average formula of the resulting partially hydrolyzed organosiloxane corresponds to $R^2aSiOb(OR^1)c(OH)d$.

All the partially hydrolyzed organosiloxanes obtained above were confirmed to satisfy the above average formula (I).

Comparative Preparation Example A-1

A solution of 44.8 parts (0.3 mol) of methyltrichlorosilane, 38.7 parts (0.3 mol) of dimethyldichlorosilane, 84.6 parts (0.4 mol) of phenyl-trichlorosilane and 200 parts of toluene was added dropwise to a mixture of 1,000 parts of water and 50 parts of acetone in a flask equipped with a stirrer, a heating jacket, a condenser, a dropping funnel and a thermometer, during which the mixture was hydrolyzed at 100° C. with stirring. After 2 hours passed after this addition was finished, stirring was stopped, and the reaction solution was transferred to a separatory funnel and left to be separated into two layers. The aqueous hydrochloric acid as the lower layer was separated to be removed. The water and hydrochloric acid remaining in the toluene solution of the organosiloxane as the upper layer were removed together with excess toluene by stripping under reduced pressure. Thereby, a 50% toluene solution of the reactive molecule-terminated silanol group-containing organopolysiloxane was obtained.

A solution of 0.6 part of dibutyltin laurate and 10 parts of toluene was added dropwise under stirring to a mixture of 100 parts of the above solution, 5 parts of methyltrimethoxysilane and 5 parts of dimethyldimethoxysilane, so that alkoxylation of the silanol group was conducted at 60° C. After 40 minutes passed after the dropwise addition was finished, stirring was stopped. The dibutyltin dilaurate and methanol were distilled off together with excess toluene. Thereby, a 80% mixed toluene solution of the partially hydrolyzed organosiloxane with a weight-average molecular weight of 8,000 was obtained. This is referred to as A-1 for comparison. The average formula of the resulting partially hydrolyzed organosiloxane corresponds to $R^2aSiOb(OR^1)c(OH)d$.

Comparative Preparation Example A-2

Seventy (70) parts of methyltrimethoxysilane, 30 parts of dimethyldimethoxysilane and 30 parts of tetraethoxysilane were mixed and then diluted with 58.3 parts of isopropyl alcohol, followed by adding a solution prepared by diluting 7.2 parts of 0.01 N hydrochloric acid with 10 parts of water. The mixture was hydrolyzed at room temperature under stirring. The resulting solution was heated in a thermostatic chamber at 60° C., to give a 30% mixed alcohol solution of the partially hydrolyzed organosiloxane with a weight-average molecular weight of 500. This is referred to as A-2 for comparison. The average formula of the resulting partially hydrolyzed organosiloxane corresponds to $R^2aSiOb(OR^1)c(OH)d$.

Then, a preparation example of component (F) as organic resin is described.

Preparation Example F-1

A solution of 0.025 part (0.15 mmol) of azobisisobutyronitrile in 3 parts of toluene was added dropwise in a nitrogen stream to a reaction solution of 5.69 parts (40 mmol) of n-butyl methacrylate (BMA), 1.24 parts (5 mmol) of trimethoxysilyl propyl methacrylate (SMA), 0.71 part (5 mmol) of glycidyl methacrylate (GMA), and 0.784 part (4 mmol) of γ-mercaptopropyltrimethoxysilane as a chain-transfer agent in 8.49 parts of toluene in a flask equipped with a stirrer, a heating jacket, a condenser, a dropping funnel, a nitrogen gas inlet and outlet and a thermometer, and the mixture was reacted at 70° C. for 2 hours. In this manner, a 40% toluene solution of acrylic resin with a weight-average molecular weight of 1,000 was obtained. This is referred to as F-1.

Conditions for preparation of F-1
  Molar ratio of monomers: BMA/SMA/GMA=8.0/1.0/1.0
  Weight-average molecular weight: 1,000
  Solid content: 40%
  Then, emulsification is described.

Example 1

Two (2) parts of polyoxyethylene nonyl phenyl ether (HLB 12.6) were added as a nonionic surface active agent (B) (polymerization inhibition) to 50 parts of the 80% toluene solution (A-1) of component (A) obtained in Preparation Example A-1, and the mixture was stirred uniformly. After stirring, the solvent was distilled off by a rotary evaporator. Five (5) parts of polyoxyethylene nonyl phenyl ether (HLB 13.5) was added to the resulting residue, and the mixture was uniformly stirred. Two hundred and ninety (290) parts of water were added thereto under stirring. The mixture was subjected to homogenizer (300 kg/cm$^2$) treatment to give a silicone emulsion, and 10 parts of titanium oxide dispersed in water (STS-01 with a solid content of 30% and an average primary particle diameter of 7 nm, a product of Ishihara Sangyo K.K.) was added thereto under stirring as a photo-semiconductor. Thereby, an antifouling silicone emulsion coating-composition (1) was obtained.

Example 2

An antifouling silicone emulsion coating-composition (2) was obtained in the same manner as in Example 1 except that the amounts of water and titanium oxide dispersed in water added were 250 parts and 50 parts respectively.

Example 3

An antifouling silicone emulsion coating-composition (3) was obtained in the same manner as in Example 1 except that the amounts of water and titanium oxide dispersed in water added were 200 parts and 100 parts respectively.

Example 4

An antifouling silicone emulsion coating-composition (4) was obtained in the same manner as in Example 1 except that the amounts of water and titanium oxide dispersed in water added were 100 parts and 200 parts respectively.

Example 5

Two (2) parts of polyoxyethylene nonyl phenyl ether (HLB 12.6) were added as a nonionic surface active agent (B) (polymerization inhibition) to 50 parts of the 80% toluene solution (A-1) of component (A) obtained in Preparation Example A-1, and the mixture was stirred uniformly. After stirring, the solvent was distilled off by a rotary evaporator. Five (5) parts of polyoxyethylene nonyl phenyl ether (HLB 13.5) were added to the resulting residue, and the mixture was uniformly stirred. Three hundred (300) parts of titanium oxide dispersed in water (STS-01 with a solid content of 30% and an average primary particle diameter of 7 nm, a product of Ishihara Sangyo K.K.) were added thereto under stirring as a photo-semiconductor, and the mixture was subjected to homogenizer (300 kg/cm$^2$) treatment to give an antifouling silicone emulsion coating-composition (5).

Example 6

An antifouling silicone emulsion coating-composition (6) was obtained in the same manner as in Example 5 except that the amount of titanium oxide dispersed in water added was 440 parts.

Example 7

Four (4) parts of sodium dodecyl benzene sulfonate were added as an anionic surface active agent to 50 parts of the 80% toluene solution (A-1) of component (A) obtained in Preparation Example A-1, and the mixture was stirred uniformly. Two hundred and ninety (290) parts of water were added thereto under stirring, the mixture was subjected to homogenizer (300 kg/cm$^2$) treatment, the toluene was distilled off by a rotary evaporator to give a silicone emulsion, and 10 parts of titanium oxide dispersed in water (STS-01 with a solid content of 30% and an average primary particle diameter of 7 nm, a product of Ishihara Sangyo K.K.) were added thereto under stirring as a photo-semiconductor to give an antifouling silicone emulsion coating-composition (7).

Example 8

An antifouling silicone emulsion coating-composition (8) was obtained in the same manner as in Example 7 except that the amounts of water and titanium oxide dispersed in water added were 250 parts and 50 parts respectively.

Example 9

An antifouling silicone emulsion coating-composition (9) was obtained in the same manner as in Example 7 except that the amounts of water and titanium oxide dispersed in water added were 200 parts and 100 parts respectively.

Example 10

An antifouling silicone emulsion coating-composition (10) was obtained in the same manner as in Example 7 except that the amounts of water and titanium oxide dispersed in water added were 100 parts and 200 parts respectively.

Example 11

Four (4) parts of sodium dodecyl benzene sulfonate were added as an anionic surface active agent to 50 parts of the 80% toluene solution (A-1) of component (A) obtained in Preparation Example A-1, and the mixture was stirred uniformly. Three hundred (300) parts of titanium oxide dispersed in water (STS-01 with a solid content of 30% and an average primary particle diameter of 7 nm, a product of Ishihara Sangyo K.K.) were added thereto under stirring as a photo-semiconductor, the mixture was subjected to homogenizer (300 kg/cm$^2$) treatment, and then the toluene was distilled off by a rotary evaporator to give an antifouling silicone emulsion coating-composition (11).

Example 12

An antifouling silicone emulsion coating-composition (12) was obtained in the same-manner as in Example 11 except that the amount of titanium oxide dispersed in water added was 440 parts.

Example 13

Four (4) parts of sodium dodecyl benzene sulfonate were added as a surface active agent to 50 parts of the 80% toluene solution (A-1) of component (A) obtained in Preparation Example A-1. The mixture was stirred uniformly. One hundred (100) parts of water were added thereto under stirring, the mixture was subjected to homogenizer (300 kg/cm$^2$) treatment, the toluene was distilled off by a rotary evaporator to give a silicone emulsion. Fifty (50) parts of a water-dispersible pigment slurry (obtained by dispersing 50 parts of titanium oxide (ST-01 with an average primary particle diameter of 7 nm, a product of Ishihara Sangyo K.K.) as a photo-semiconductor, 5 parts of a nonionic urethane acrylic block copolymer (RM-830 with a solid content of 30%, butylcarbitol/water=28/72 (ratio by weight). aqueous solution, a product of Rohm & Haas K.K.) and 45 parts of water for 1 hour by a paint shaker) were added to the emulsion give an antifouling silicone emulsion coating-composition (13).

Example 14

Two (2) parts of polyoxyethylene nonyl phenyl ether (HUB 9.7) were added as an nonionic surface active agent to 100 parts of the 30% mixed alcohol solution (A-2) of component (A) obtained in Preparation Example A-2, the mixture was stirred uniformly, and the alcohol was distilled off by a rotary evaporator. Five (5) parts of polyoxyethylene nonyl phenyl ether (HLB 13.6) were added to 32 parts of the resulting residue, and the mixture was stirred uniformly. One hundred (100) parts of water were added to the mixture under stirring, the mixture was subjected to homogenizer (300 kg/cm$^2$) treatment to give a silicone emulsion, and 50 parts of titanium oxide dispersed in water (STS-01 with a solid content of 30% and an average primary particle diameter of 7 nm, a product of Ishihara Sangyo K.K.) were added thereto under stirring as a photo-semiconductor to give an antifouling silicone emulsion coating-composition (14).

Example 15

Fifty (50) parts of titanium oxide dispersed in methanol (Queen Titanic 11-1020G(c) with a solid content of 20% and an average primary particle diameter of 5 nm, a product of Shokubai Kasei K.K.) were added to 100 parts of the 30% mixed alcohol solution (A-2) of component (A) obtained in Preparation Example A-2, followed by adding 2 parts of polyoxyethylene nonyl phenyl ether (HLB 13.6) as a surface active agent, and the mixture was stirred uniformly. The alcohol was distilled off by a rotary evaporator. Five (5) parts of polyoxyethylene nonyl phenyl ether (HLB 18) were added to 42 parts of the resulting residue, and the mixture was stirred uniformly. One hundred and fifty (150) parts of water were added thereto under stirring, and the mixture was subjected to homogenizer (300 kg/cm$^2$) treatment to give an antifouling silicone emulsion coating-composition (15).

Example 16

Two (2) parts of polyoxyethylene nonyl phenyl ether (HLB 12.6) were added as a surface active agent to 100 parts of the 30% methanol solution (A-3) of oxidized titanium-mixed partially hydrolyzed organosiloxane as the mixture of components (A) and (C) obtained in Preparation Example A-3, the mixture was stirred uniformly, and the alcohol was distilled off by a rotary evaporator. Five (5) parts of polyoxyethylene nonyl phenyl ether (HLB 13.7) were added to 32 parts of the resulting residue, and the mixture was stirred uniformly. One hundred (100) parts of water were added thereto under stirring, and the mixture was subjected to homogenizer (300 kg/cm$^2$) treatment to give an antifouling silicone emulsion coating-composition (16).

Example 17

Four (4) parts of polyoxyethylene nonyl phenyl ether (HLB 13.7) were added as a surface active agent to 50 parts of the 80% toluene solution (A-1) of component (A) obtained in Preparation Example A-1, and the mixture was stirred uniformly. One hundred (100) parts of acid colloidal silica dispersed in water (Snowtex O with a solid content of 20%, a product of Nissan Kagaku Kogyo K.K.) and 50 parts of water were added thereto under stirring, the mixture was subjected to homogenizer (300 kg/cm$^2$) treatment, the toluene was-distilled off by a rotary evaporator to give a silicone emulsion. Thirty (30) parts of titanium oxide dispersed in water (STS-01 with a solid content of 30% and an average primary particle diameter of 7 nm, a product of Ishihara Sangyo K.K.) were added to the emulsion under stirring as a photo-semiconductor to give an antifouling silicone emulsion coating-composition (17).

Example 18

Three (3) parts of polyoxyethylene nonyl phenyl ether (HLB 5.7) were added as a surface active agent to 100 parts of the 30% methanol solution (A-4) of the colloidal silica-mixed partially hydrolyzed organosiloxane obtained in Preparation Example A-4, the mixture was stirred uniformly, and the methanol was distilled off by a rotary evaporator. Three (3) parts of polyoxyethylene nonyl phenyl ether (HLB 13.7) were added to 33 parts of the resulting residue, and the mixture was well stirred to give a uniform solution. One hundred (100) parts of water were added thereto under stirring, the mixture was subjected to homogenizer (300 kg/cm$^2$) treatment to give a silicone emulsion, and 30 parts of titanium oxide dispersed in water (STS-0 with a solid content of 30% and an average primary particle diameter of 7 nm, a product of Ishihara Sangyo K.K.) were added thereto under stirring as a photo-semiconductor to give an antifouling silicone emulsion coating-composition (18).

Example 19

Twenty (20) parts of straight-chain dimethyl polysiloxane diol with a weight-average molecular weight Mw=800 (n≈11) and 4 parts of polyoxyethylene nonyl phenyl ether (HLB 13.7) as a surface active agent were added to 50 parts of the 80% toluene solution (A-1) of component (A) obtained in Preparation Example A-1, and the mixture was stirred uniformly. One hundred and forty (140) parts of water were added thereto under stirring, the mixture was subjected to homogenizer (300 kg/cm$^2$) treatment, the toluene was distilled off by a rotary evaporator to give a silicone emulsion, and 50 parts of titanium oxide dispersed in water (STS-01 with a solid content of 30% and an average primary particle diameter of 7 nm, a product of Ishihara Sangyo K.K.) were added thereto under stirring as a photo-semiconductor. Thereby, an antifouling silicone emulsion coating-composition (19) mixed with the straight-chain dimethyl polysiloxane diol was obtained.

Example 20

Four (4) parts of polyoxyethylene nonyl phenyl ether (HLB 11.0) were added as a surface active agent to 50 parts of the 80% toluene solution (A-1) of component (A) obtained in Preparation Example A-1, and the mixture was stirred uniformly. One hundred and forty (140) parts of water were added thereto under stirring, the mixture was subjected to homogenizer (300 kg/cm$^2$) treatment, and the toluene was distilled off by a rotary evaporator to give a silicone emulsion. Fifty (50) parts of titanium oxide dispersed in water (STS-01 with a solid content of 30% and an average primary particle diameter of 7 nm, a product of Ishihara Sangyo K.K.) were added thereto under stirring as a photo-semiconductor, 40 parts of a straight-chain dimethyl polysiloxane diol emulsion (prepared by adding 5 parts of polyoxyethylene nonyl phenyl ether (HLB 11.0) as a surface active agent to 50 parts of straight-chain dimethyl polysiloxane diol with a weight-average molecular weight Mw=800 (n≈11), then stirring the mixture uniformly, adding 45 parts of water to it under stirring, subjecting it to homogenizer (300 kg/cm$^2$) treatment to form an emulsion) were added thereto under stirring. Thereby, an antifouling silicone emulsion coating-composition (20) mixed with the straight-chain dimethyl polysiloxane diol was obtained.

Example 21

Three (3) parts of straight-chain dimethyl polysiloxane diol with a weight-average molecular weight Mw=800 (n≈11), 1 part of straight-chain dimethyl polysiloxane diol with a weight-average molecular weight Mw=3,000 (n≈40), and 2 parts of polyoxyethylene nonyl phenyl ether (HLB 12.6) as a surface active agent were added to 100 parts of the 30% mixed alcohol solution (A-2) of component (A) obtained in Preparation Example A-2, the mixture was stirred uniformly, and the alcohol was distilled off by a rotary evaporator. Five (5) parts of polyoxyethylene nonyl phenyl ether (HLB 13.7) were added as a surface active agent to 36 parts of the resulting residue, and the mixture was stirred well to give a homogenous mixture. One hundred and fifty (150) parts of water were added thereto, the mixture was subjected to homogenizer (300 kg/cm$^2$) treatment to give a silicone emulsion, and 30 parts of titanium oxide dispersed in water (STS-01 with a solid content of 30% and an average primary particle diameter of 7 nm, a product of Ishihara Sangyo K.K.) were added thereto under stirring as a photo-semiconductor. Thereby, an antifouling silicone emulsion coating-composition (21) mixed with the straight-chain dimethyl polysiloxane diol was obtained.

Example 22

Four (4) parts of polyoxyethylene nonyl phenyl ether (HLB 13.7) were added as a surface active agent to 50 parts of the 80% toluene solution (A-1) of component (A) obtained in Preparation Example A-1, and the mixture was stirred uniformly. Then, 150 parts of water were added under stirring, the mixture was subjected to homogenizer (300 kg/cm$^2$) treatment, the toluene was distilled off by a rotary evaporator to give a silicone emulsion, and 50 parts of titanium oxide dispersed in water (STS-01 with a solid content of 30% and an average primary particle diameter of 7 nm, a product of Ishihara Sangyo K.K.) were added thereto under stirring as a photo-semiconductor to give an antifouling silicone emulsion coating-composition. Six (6) parts of an acrylic emulsion (Acryset EX35 with a solid content of 42%, a product of Nippon Shokubai K.K.) was mixed with 100 parts of this composition. Thereby, an acrylic resin-mixed antifouling silicone emulsion coating-composition (22) was obtained.

Example 23

Twenty (20) parts of the 40% toluene solution (F-1) of acrylic resin obtained in Preparation Example F-1 and 4 parts of polyoxyethylene nonyl phenyl ether (HLB 13.7) as a surface active agent were added to 50 parts of the 80% toluene solution (A-1) of component (A) obtained in Preparation Example A-1, and the mixture was stirred uniformly. Then, 150 parts of water were added under stirring, the mixture was emulsified by homogenizer (300 kg/cm$^2$) treatment, the toluene was distilled off by a rotary evaporator to give a silicone emulsion, and 50 parts of titanium oxide dispersed in water (STS-01 with a solid content of 30% and an average primary particle diameter of 7 nm, a product of Ishihara Sangyo K.K.) were added thereto under stirring as a photo-semiconductor. Thereby, an acrylic modified antifouling silicone emulsion coating-composition (23) was obtained.

Example 24

Ten (10) parts of the 40% toluene solution (F-1) of acrylic resin obtained in Preparation Example F-1, 3 parts of straight-chain dimethyl polysiloxane diol with a weight-average molecular weight Mw=800 (n≈11), and 3 parts of polyoxyethylene nonyl phenyl ether (HLB 5.7) as a surface active agent were added to 100 parts of the 30% methanol solution (A-4) of the colloidal silica-mixed partially hydrolyzed organosiloxane obtained in Preparation Example A-4, and the mixture was stirred uniformly. Then, the methanol and toluene were distilled off by a rotary evaporator. Three (3) parts of polyoxyethylene nonyl phenyl ether (HLB 13.7) were added as a surface active agent to 39 parts of the resulting residue, and the mixture was stirred well and uniformly. One hundred (100) parts of water were added thereto under stirring, and the mixture was subjected to homogenizer (300 kg/cm$^2$) treatment to give a silicone emulsion. Fifty (50) parts of titanium oxide dispersed in water (STS-01 with a solid content of 30% and an average primary particle diameter of 7 nm, a product of Ishihara Sangyo K.K.) were added thereto under stirring as a photo-semiconductor. Thereby, an acrylic modified antifouling silicone emulsion coating-composition (24) mixed with the colloidal silica/straight-chain dimethyl polysiloxane diol was obtained.

Example 25

Four (4) parts of polyoxyethylene nonyl phenyl ether (HLB 13.7) were added as a surface active agent to 50 parts of the 80% toluene solution (A-1) of component (A) obtained in Preparation Example A-1, and the mixture was stirred uniformly. Then, 150 parts of water were added thereto under stirring, the mixture was subjected to homogenizer (300 kg/cm$^2$) treatment, the toluene was distilled off by a rotary evaporator to give a silicone emulsion. Fifty (50) parts of titanium oxide dispersed in water (STS-01 with a solid content of 30% and an average primary particle diameter of 7 nm, a product of Ishihara Sangyo K.K.) as a photo-semiconductor and 70 parts of water-dispersible pigment slurry (EP-62 White, 62% titanium oxide, a product of Dainichiseika K.K.) as a pigment were successively added under stirring. Thereby, a white pigment-dispersed antifouling silicone emulsion coating-composition (25) was obtained.

Example 26

Two (2) parts of polyoxyethylene nonyl phenyl ether (HLB 12.6) were added as a surface active agent to 100 parts of the 30% mixed alcohol solution (A-5) of component (A) obtained in Preparation Example A-5, the mixture was stirred uniformly, and the alcohol was distilled off by a rotary evaporator. Then, 5 parts of polyoxyethylene nonyl phenyl ether (HLB 13.7) were added as a surface active agent to 32 parts of the resulting residue, and the mixture was stirred uniformly. One hundred (100) parts of water were added thereto under stirring, and the mixture was subjected to homogenizer (300 kg/cm$^2$) treatment to give a silicone emulsion, followed by adding 50 parts of titanium oxide dispersed in water (STS-01 with a solid content of 30% and an average primary particle diameter of 7 nm, a product of Ishihara Sangyo K.K.) as a photo-semiconductor. Thereby, an antifouling silicone emulsion coating-composition (26) was obtained.

Example 27

Four (4) parts of sodium dodecyl benzene sulfonate were added as a surface active agent to 50 parts of the 80% toluene solution (A-6) of component (A) obtained in Preparation Example A-6, and the mixture was stirred uniformly. Two hundred and fifty (250) parts of water were added thereto under stirring, the mixture was subjected to homogenizer (300 kg/cm$^2$) treatment, the toluene was distilled off by a rotary evaporator to give a silicone emulsion, and 50 parts of titanium oxide dispersed in water (STS-01 with a solid content of 30% and an average-primary particle diameter of 7 nm, a product of Ishihara Sangyo K.K.) were added thereto under stirring as a photo-semiconductor to give an antifouling silicone emulsion coating-composition (27).

Example 28

Four (4) parts of sodium dodecyl benzene sulfonate were added as a surface active agent to 50 parts of the 80% toluene solution (A-1) of component (A) obtained in Preparation Example A-1, and the mixture was stirred uniformly. One hundred (100) parts of water were added thereto under stirring, the mixture was subjected to homogenizer (300 kg/cm$^2$) treatment, the toluene was distilled off by a rotary evaporator to give a silicone emulsion, and 50 parts of a water-dispersible pigment slurry (obtained by dispersing 50 parts of titanium oxide (ST-11 with an average primary particle diameter of 22 nm, a product of Ishihara Sangyo K.K.) as a photo-semiconductor, 5 parts of a nonionic urethane acrylic block copolymer (PM-830 with a solid content of 30%, butylcarbitol/water=28/72 (ratio by weight) aqueous solution, a product of Rohm & Haas K.K.) and 45 parts of water for 1 hour by a paint shaker) were added thereto and stirred to give an antifouling silicone emulsion coating-composition (28).

Example 29

Zinc oxide dispersed in toluene (32.3 parts)(ZS-300 with a solid content of 31% and an average primary particle diameter of 10 nm, a product of Osaka Sumitomo Cement K.K.) were added as a photo-semiconductor to 100 parts of the 30% mixed alcohol solution (A-2) of component (A) obtained in Preparation Example A-2, 2 parts of polyoxyethylene nonyl phenyl ether (HLB 12.6) were added thereto as a surface active agent, the mixture was stirred uniformly, and the alcohol was distilled off by a rotary evaporator. Five (5) parts of polyoxyethylene nonyl phenyl ether (HLB 13.7) were added as a surface active agent to 42 parts of the resulting residue and mixed uniformly. One hundred and fifty (150) parts of water were added thereto under stirring, and the mixture was subjected to homogenizer (300 kg/cm$^2$) treatment. Thereby, an antifouling silicone emulsion coating-composition (29) was obtained.

Example 30

Four (4) parts of sodium dodecyl benzene sulfonate were added as a surface active agent to 50 parts of the 80% toluene solution (A-1) of component (A) obtained in Preparation Example A-1, and the mixture was stirred uniformly. One hundred (100) parts of water were added thereto under stirring, the mixture was subjected to homogenizer (300 kg/cm$^2$) treatment, the toluene was distilled off by a rotary evaporator to give a silicone emulsion. Fifty (50) parts of a water-dispersible pigment slurry (obtained by dispersing 50 parts of titanium oxide powder carrying 0.5% platinum as a photo-semiconductor, 5 parts of a nonionic urethane acrylic block copolymer (RM-830 with a solid content of 30%, butylcarbitol/water=28/72 (ratio by weight) aqueous solution, a product Rohm & Haas K.K.) and 45 parts of water for 1 hour by a paint shaker) were added thereto and stirred to give an antifouling silicone emulsion coating-composition (30). The above titanium oxide powder carrying 0.5% platinum used in preparation of this composition was prepared by adding titaniumoxide powder (STS-01 with an average primary particle diameter of 7 nm, a product of Ishihara Sangyo K.K.) to 5% aqueous solution of chloride platinate, then dehydrating and drying it, and exposing it to UV rays, thereby 0.5% platinum was supported on the titanium oxide.

Example 31

Ten (10) parts of straight-chain dimethyl polysiloxane diol with a weight-average molecular weight Mw=800 (n≈11), 10 parts of dimethyl dicyclohexane diol where n=2 [HO((CH$_3$)$_2$SiO)$_2$H], and 4 parts of polyoxyethylene nonyl phenyl ether (HLB 13.7) as a surface active agent were added to 50 parts of the 80% toluene solution (A-1) of component (A) obtained in Preparation Example A-1, and the mixture was stirred uniformly. One hundred and forty (140) parts of water were added thereto under stirring, the mixture was subjected to homogenizer (300 kg/cm$^2$) treatment, the toluene was distilled off by a rotary evaporator to give a silicone emulsion, and 50 parts of titanium oxide dispersed in water (STS-01 with a solid content of 30% and an average primary particle diameter of 7 nm, a product of Ishihara Sangyo K.K.) were added thereto under stirring as a photo-semiconductor. Thereby, an antifouling silicone emulsion coating-composition (31) mixed with the straight-chain dimethyl polysiloxane diol was obtained.

Example 32

Ten (10) parts of straight-chain dimethyl polysiloxane diol with a weight-average molecular weight Mw=800 (n≈11), 10 parts of straight-chain methyl phenyl polysiloxane diol with a weight-average molecular weight MW=450 (n≈4), and 4 parts of polyoxyethylene nonyl phenyl ether (HLB 13.7) as a surface active agent were added to 50 parts of the 80% toluene solution (A-1) of component (A) obtained in Preparation Example A-1, and the mixture was stirred uniformly. One hundred and forty (140) parts of water were added thereto under stirring, the mixture was subjected to homogenizer (300 kg/cm$^2$) treatment, and the toluene was distilled off by a rotary evaporator to give a silicone emulsion. Fifty (50) parts of titanium oxide dispersed in water (STS-01 with a solid content of 30% and an average primary particle diameter of 7 nm, a product of Ishihara Sangyo K.K.) were added thereto under stirring as a photo-semiconductor. Thereby, an antifouling silicone emulsion coating-composition (32) mixed with the straight-chain dimethyl polysiloxane diol was obtained.

Example 33

Threwe (3) parts of straight-chain dimethyl polysiloxane diol with a weight-average molecular weight Mw=800 (n≈11), 1 part of straight-chain dimethyl polysiloxane diol with a weight-average molecular weight Mw=4,200 (n≈55), and 2 parts of polyoxyethylene nonyl phenyl ether (HLB 12.6) as a surface active agent were added to 100 parts of the 30% mixed alcohol solution (A-2) of component (A) obtained in Preparation Example A-2, the mixture was stirred uniformly, and the alcohol was distilled off by an rotary evaporator. Five (5) parts of polyoxyethylene nonyl phenyl ether (HLB 13.7) were added as a surface active agent to 36 parts of the resulting residue, and the mixture was stirred well and uniformly. After 150 parts of water were added thereto under stirring, the mixture was subjected to homogenizer (300 kg/cm$^2$) treatment to give a silicone emulsion. Thirty (30) parts of titanium oxide dispersed in water (STS-01 with a solid content, of 30% and an average primary particle diameter of 7 nm, a product of Ishihara Sangyo K.K.) were added thereto under stirring as a photo-semiconductor. Thereby, an antifouling silicone emulsion coating-composition (33) mixed with the straight-chain dimethyl polysiloxane diol was obtained.

Example 34

Two (2) parts of polyoxyethylene lauryl ether (HLB 9.7) as a nonionic surface active agent were added to 100 parts of the 30% mixed alcohol solution (A-2) of component (A) obtained in Preparation Example A-2, and the mixture was stirred uniformly. The alcohol was distilled off by a rotary evaporator. Five (5) parts of polyoxyethylene lauryl ether (HLB 13.6) were added as a surface active agent to 32 parts of the resulting residue, and the mixture was stirred uniformly. One hundred (100) parts of water were added thereto under stirring, the mixture was subjected to homogenizer (300 kg/cm$^2$) treatment to give a silicone emulsion, and 50 parts of titanium oxide dispersed in water (STS-01 with a solid content of 30% and an average primary particle diameter of 7 nm, a product of Ishihara Sangyo K.K.) were further added thereto under stirring as a photo-semiconductor. Thereby, an antifouling silicone emulsion coating-composition (34) was obtained.

Comparative Example 1

A silicone emulsion coating-composition (1) for comparison was obtained in the same manner as in Example 1 except that titanium oxide dispersed in water was not added.

Comparative Example 2

A silicone emulsion coating-composition (2) for comparison was obtained in the same manner as in Example 1 except that the amount of water and titanium oxide dispersed in water added were 200 parts and 5 parts respectively.

Comparative Example 3

A silicone emulsion coating-composition (3) for comparison was obtained in the same manner as in Example 5 except that the amount of titanium oxide dispersed in water added was 600 parts.

Comparative Example 4

Fifty (50) parts of titanium oxide dispersed in water (STS-01 with a solid content of 30% and an average-primary particle diameter of 7 nm, a product of Ishihara Sangyo K.K.) and 150 parts of water were added under stirring to 50 parts of the 80% toluene solution (A-1) of component (A) obtained in Preparation Example A-1. An antifouling silicone emulsion coating-composition was attempted to be obtained by subjecting the mixture to homogenizer (300 kg/cm$^2$) treatment, but the titanium oxide underwent aggregation, phase separation and precipitation, so that no homogenous dispersion could not be obtained.

Comparative Example 5

Four (4) parts of sodium dodecyl benzene sulfonate were added as a surface active agent to 50 parts of the 80% toluene solution (A-1 for comparison) of the partially hydrolyzed organosiloxane with a weight-average molecular weight of 8,000 obtained in Comparative Preparation Example A-1, and the mixture was stirred uniformly. Two hundred and fifty (250) parts of water were added thereto under stirring, the mixture was subjected to homogenizer (300 kg/cm$^2$) treatment, and the toluene was distilled off by a rotary evaporator to give a silicone emulsion, followed by further adding 50 parts of titanium oxide dispersed in water (STS-01 with a solid content of 30% and an average primary particle diameter of 7 nm, a product of Ishihara Sangyo K.K.) under stirring. Thereby, a silicone emulsion coating-composition (5) for comparison was obtained.

Comparative Example 6

Titanium oxide dispersed in water (33.3 parts) (STS-01 with a solid content of 30% and an average primary particle diameter of 7 nm, a product of Ishihara Sangyo K.K.) were added to 42 parts of a commercial acrylic emulsion (Acryset EX35 with a solid content of 42%, a product of Nippon Shokubai K.K.) and mixed to give an acrylic emulsion coating-composition (6) for comparison.

Comparative Example 7

Fifty (50) parts of titanium oxide dispersed in methanol (Queen Titanic 11-1020G with a solid content of 20% and an average primary particle diameter of 5 nm, a product of Shokubai Kasei K.K.) were added as a photo-semiconductor to 100 parts of the 30% mixed alcohol solution (A-2 for comparison) of the partially hydrolyzed organosiloxane with a weight-average molecular weight of 500 obtained in Comparative Preparation Example A-2, then 2 parts of polyoxyethylene nonyl phenyl ether (HLB 12.6) were added thereto as a surface active agent, the mixture was stirred uniformly, and the alcohol was removed by a rotary evaporator. Five (5) parts of polyoxyethylene nonyl phenyl ether (HLB 13.7) were added to 42 parts of the resulting residue, and the mixture was stirred uniformly. One hundred and fifty (150) parts of water were added thereto under stirring, and the mixture was subjected to homogenizer (300 kg/cm$^2$) treatment to give a silicone emulsion coating-composition (7) for comparison.

Comparative Example 8

Two (2) parts of polyoxyethylene nonyl phenyl ether (HLB 5.7) were added as a nonionic surface active agent to 50 parts of the 80% toluene solution (A-1) of component (A) obtained in Preparation Example A-1, and the mixture was stirred uniformly. After stirring, the solvent was removed by a rotary evaporator. Five (5) parts of polyoxyethylene nonyl phenyl ether (HLB 7.8) were added to the resulting residue, and the mixture was stirred uniformly. Two hundred and ninety (290) parts of water were added thereto under stirring, the mixture was subjected to homogenizer (300 kg/cm$^2$) treatment to give a silicone emulsion, and 10 parts of titanium oxide dispersed in water (STS-01 with a solid content of 30% and an average primary particle diameter of 7 nm, a product of Ishihara Sangyo K.K.) were further added thereto under stirring as a photo-semiconductor. Thereby, a silicone emulsion coating-composition (8) for comparison was obtained.

The characteristics of the emulsion coating-compositions obtained above in Examples and Comparative Examples were evaluated in the following manner.
(Emulsification stability):

One (1) and 3 months after emulsification, the state of emulsification of the coating composition in each-example was visually observed and evaluated in the following criteria:

◯: Uniform and white milky liquid without any aggregated precipitates;

Δ: Uniform and white milky liquid with a trace amount of aggregated precipitates;

X : non-uniform phase separation with precipitates.
(Film-forming properties):

The coating composition in each example was applied by a bar coating machine onto the surface of a Pyrex glass plate such that its dried coat thickness was 1 μm, then dried at room temperature and the state of the dried coat was visually observed and evaluated in the following evaluation criteria:

◯: Continuous and transparent film;

X: Discontinuous and opaque film (whitening due to phase separation and aggregation, excluding whitening due to coarse particles such as pigments etc.)
(Transparency):

The coating composition in each example was applied by a bar coating machine onto the surface of a Pyrex glass plate such that its dried coat thickness was 1 μm, then dried at room temperature and the transparency of the dried coat was determined by a Haze meter.
(Curing properties by heat):

The coating composition in each example was applied by a bar coating machine onto the surface of a Pyrex glass plate such that its dried coat thickness was 1 μm, then dried at room temperature, and the cured coat formed by curing at 150° C. for 30 minutes was scratched with the tip of a finger-nail, and the cured coat after scratching was visually observed and evaluated in the following evaluation criteria:

◯: No flaw remains;

X: A flaw remains;

If no flaw remains, the pencil hardness of the cured coat was determined according to JIS-K5400.
(Curing properties at a room-temperature):

A coating composition containing a curing catalyst, prepared by adding 5 parts of 10 weight-% aqueous potassium acetate (curing catalyst) solution relative to 100 parts of the component (A) in the coating composition in each example was applied by a bar coating machine onto the surface of a Pyrex glass plate such that its dried coat thickness was 1 μm, then dried at room temperature. A cured coat was formed for 1 week in a thermostatic chamber set at 40° C. and 90% humidity. The resulting cured coat was scratched with the tip of a finger-nail. The cured coat after scratching was visually observed and evaluated in the following evaluation criteria:

◯: No flaw remains;

X: A flaw remains.

If no flaw remains, the pencil hardness of the cured coat was determined according to JIS-K5400.
(Resistance to cracking):

The coating composition in each example was applied by a bar coating machine onto the surface of a Pyrex glass plate such that its dried coat thickness was 1, 5 or 20 μm, then dried at room temperature. An outer appearance of the cured coat formed by curing at 150° C. for 30 minutes was visually observed and evaluated in- the following evaluation criteria:

◯: No cracking;

Δ: Local occurrence of fine cracks;

X: Cracking on the whole face.

(Adherence):

A coating composition containing a curing catalyst, prepared by adding 5 parts of 10 weight-% aqueous potassium acetate (curing catalyst) solution relative to 100 parts of the component (A) in the coating composition in each example was applied by a bar coating machine onto one face of a Pyrex glass plate of 30 mm×30 mm size such that its dried coat thickness was 1 μm, then dried at room temperature. The coat was cured for 1 week in a thermostatic chamber set at 40° C. and 90% humidity. The adherence of the resulting cured coat was evaluated in a check-patterned adhesive tape (using a cellophane tape) peeling test.

(Photo-catalytic decomposition action):

A coating composition containing a curing catalyst, prepared by adding 5 parts of 10 weight-% aqueous potassium acetate (curing catalyst) solution relative to 100 parts of the component (A) in the coating composition in each example was applied by a bar coating machine onto one face of a Pyrex glass plate of 30 mm×30 mm size such that its dried coat thickness was 1 μm, then dried at room temperature. The coat was cured for 1 week in a thermostatic chamber set at 40° C. and 90% humidity. The resulting sample was placed in a 300-ml sealed glass vessel, then an acetaldehyde gas was introduced into it at a concentration of 50 ppm. The sample was irradiated with 10 W black light for 60 minutes, and the rate of removal of acetaldehyde was determined by gas chromatography (GC14A, produced by Shimadzu Seisakusyo K.K.).

(Water-wetting properties):

A coating composition containing a curing catalyst, prepared by adding 5 parts of 10 weight-% aqueous potassium acetate (curing catalyst) solution relative to 100 parts of the component (A) in the coating composition in each example was applied by a bar coating machine onto one face of a Pyrex glass plate of 30 mm×30 mm size such that its dried coat thickness was 1 μm, then dried at room temperature. The coat was cured for 1 week in a thermostatic chamber set at 40° C. and 90% humidity. The water-wetting properties of the resulting cured coat was evaluated by measuring a contact angle of the cured coat to water. A sample just after the coat was formed and a sample subjected 10 times to 1-hour irradiation with UV rays (Handy UV 300, produced by Oak Seisakusho K.K.) and subsequent: washing with water were used respectively for measurement of contast angle.

(Weather resistance):

The coating composition in each example was applied by a bar coating machine onto the surface of a Pyrex glass plate such that its dried coat thickness was 1 μm, then dried at room temperature and cured at 150° C. for 30 minutes. The resulting sample was subjected to a promoted weather resistance test for 1200 hours using a Sunshine Super Long Weather Meter (WEL-SUN-HC, manufactured by Suga Shikenki K.K.). Then, the coat was observed and a sample with no change-was regarded as excellent.

The ingredients of the coating compositions in the respective examples are shown in Tables 1 to 6, and their evaluation results are shown in Tables 7 to 12.

Then, coated articles were prepared in the following manner.

Examples 35 to 58 & Comparative Examples 9 to 20

Five (5) parts of 10% by weight of potassium acetate (curing catalyst) solution were added relative to 100 parts of the component (A) in each of the antifouling silicone emulsion coating-composition (2) obtained in Example 2, the antifouling silicone emulsion coating-composition (24) obtained in Example 24, and the antifouling silicone emulsion coating-composition (1) for comparison obtained in Comparative Example 1. Thereby, each coating composition containing the curing catalyst was obtained.

Each of the resulting coating compositions containing the curing catalyst was applied by bar-coating onto the following substrates such that its dried coat thickness was 1 or 20 μm, then dried at room temperature and cured for 1 week in a thermostat humidity chamber set at a temperature of 40° C. and 90% humidity. Thus, each coated article was obtained.

Each of the resulting coated articles was evaluated for coat characteristics (adherence, rate of removal of acetaldehyde, wetting properties-contact angle). For additional evaluation items, the sample was placed in boiling running water for 1 hour and then left for 1 hour. An outer appearance of its coat was observed and a sample with no change was regarded as excellent.

The substrates used were as follows: Stainless plate: SUS 304 plate (150 mm×70 mm×0.5 mm). organic coatedplate: thermosetting acrylic resin-coated aluminum plate (150 mm×70 mm×2 mm). PC plate: polycarbonate plate (150 mm×70 mm×5 mm). Slate plate: fiber-reinforced cement plate (150 mm×70 mm×3 mm). Inorganic coated plate: A Pyrex glass plate (100 mm×100 mm×1 mm) which was coated by bar coating with 30% mixed alcohol solution (A-2) of component (A) obtained in Preparation Example A-2 such that its dried coat thickness was 1 μm, then dried at room temperature and cured at a temperature of 150° C. for 20 minutes. FRP plate: glass-reinforced acrylic plate (150 mm×70 mm×5 mm).

If necessary, an epoxy type sealer (Epoxy E Sealer (c), Isamu Toryo K.K.) was used as a primer.

The results of evaluation of the coated articles are shown in Tables 12 to 18.

TABLE 1

| | Example 1 | Example 2 | Example 3 | Example 4 | Example 5 | Example 6 |
|---|---|---|---|---|---|---|
| Composition (parts) Component A | | | | | | |
| Amount | 40 | 40 | 40 | 40 | 40 | 40 |
| Type | A-1 | A-1 | A-1 | A-1 | A-1 | A-1 |

TABLE 1-continued

|  | Example 1 | Example 2 | Example 3 | Example 4 | Example 5 | Example 6 |
|---|---|---|---|---|---|---|
| Component B | 7 | 7 | 7 | 7 | 7 | 7 |
| Component C | 3 | 15 | 30 | 60 | 90 | 132 |
| Component D | 297 | 285 | 270 | 240 | 210 | 308 |
| Silica | — | — | — | — | — | — |
| Component E | — | — | — | — | — | — |
| Organic resin | — | — | — | — | — | — |
| Pigment | — | — | — | — | — | — |
| Others | — | — | — | — | — | — |
| Ratio of each component composition (%) | | | | | | |
| A/Total amount of composition | 11.5 | 11.5 | 11.5 | 11.5 | 11.5 | 8.9 |
| C/Total amount of solids | 6.0 | 24.2 | 40.5 | 57.7 | 67.2 | 75.0 |
| B/A | 17.5 | 17.5 | 17.5 | 17.5 | 17.5 | 17.5 |
| D/Total amount of composition | 86 | 82 | 78 | 69 | 61 | 63 |
| Silica/A | — | — | — | — | — | — |
| E/A | — | — | — | — | — | — |
| Organic resin/A | — | — | — | — | — | — |

TABLE 2

|  | Example 7 | Example 8 | Example 9 | Example 10 | Example 11 | Example 12 | Example 13 | Example 14 |
|---|---|---|---|---|---|---|---|---|
| Composition (parts) | | | | | | | | |
| Component A | | | | | | | | |
| Amount | 40 | 40 | 40 | 40 | 40 | 40 | 40 | 40 |
| Type | A-1 | A-1 | A-1 | A-1 | A-1 | A-1 | A-1 | A-2 |
| Component B | 4 | 4 | 4 | 4 | 4 | 4 | 4 | 7 |
| Component C | 3 | 15 | 30 | 60 | 90 | 132 | 25 | 15 |
| Component D | 297 | 285 | 270 | 240 | 210 | 308 | 146 | 135 |
| Silica | — | — | — | — | — | — | — | — |
| Component E | — | — | — | — | — | — | — | — |
| Organic resin | — | — | — | — | — | — | — | — |
| Pigment | — | — | — | — | — | — | 4 | — |
| Others | — | — | — | — | — | — | — | — |
| Ratio of each component composition (%) | | | | | | | | |
| A/Total amount of composition | 11.6 | 11.6 | 11.6 | 11.6 | 11.6 | 8.3 | 18.3 | 20.3 |
| C/Total amount of solids | 6.3 | 25.4 | 40.5 | 57.7 | 67.2 | 75.0 | 35.5 | 28.8 |
| B/A | 10 | 10 | 10 | 10 | 10 | 10 | 10 | 23 |
| D/Total amount of composition | 86 | 83 | 78 | 70 | 61 | 64 | 67 | 72 |
| Silica/A | — | — | — | — | — | — | — | — |
| E/A | — | — | — | — | — | — | — | — |
| Organic resin/A | — | — | — | — | — | — | — | — |

TABLE 3

|  | Example 15 | Example 16 | Example 17 | Example 18 | Example 19 | Example 20 | Example 21 |
|---|---|---|---|---|---|---|---|
| Composition (parts) | | | | | | | |
| Component A | | | | | | | |
| Amount | 30 | 25 | 40 | 21 | 40 | 40 | 30 |
| Type | A-2 | A-3 | A-1 | A-4 | A-1 | A-1 | A-2 |
| Component B | 7 | 7 | 4 | 6 | 4 | 6 | 7 |

TABLE 3-continued

|  | Example 15 | Example 16 | Example 17 | Example 18 | Example 19 | Example 20 | Example 21 |
|---|---|---|---|---|---|---|---|
| Component C | 10 | 5 | 9 | 9 | 15 | 15 | 9 |
| Component D | 150 | 100 | 130 | 121 | 175 | 193 | 171 |
| Silica | — | — | 20 | 9 | — | — | — |
| Component E | — | — | — | — | 20 | 20 | 4 |
| Organic resin | — | — | — | — | — | — | — |
| Pigment | — | — | — | — | — | — | — |
| Others | — | — | — | — | — | — | — |
| Ratio of each component composition (%) | | | | | | | |
| A/ Total amount of composition | 15.2 | 18.2 | 19.7 | 12.7 | 15.7 | 14.5 | 13.6 |
| C/ Total amount of solids | 21.3 | 13.5 | 12.3 | 35 | 19 | 18.7 | 18 |
| B/A | 23 | 28 | 10 | 29 | 10 | 15 | 23 |
| D/ Total amount of composition | 76 | 73 | 64 | 73 | 69 | 70 | 77 |
| Silica/A | — | — | 40 | 43 | — | — | — |
| E/A | — | — | — | — | 50 | 50 | 13.3 |
| Organic resin/A | — | — | — | — | — | — | — |

TABLE 4

|  | Example 22 | Example 23 | Example 24 | Example 25 | Example 26 | Example 27 | Example 28 |
|---|---|---|---|---|---|---|---|
| Composition (parts) Component A | | | | | | | |
| Amount | 16.3 | 40 | 21 | 40 | 30 | 40 | 40 |
| Type | A-1 | A-1 | -4 | A-1 | A-5 | A-6 | A-1 |
| Component B | 1.6 | 4 | 6 | 4 | 7 | 4 | 4 |
| Component C | 6.1 | 15 | 15 | 15 | 15 | 15 | 25 |
| Component D | 79.2 | 185 | 135 | 210 | 135 | 285 | 146 |
| Silica | — | — | 9 | — | — | — | — |
| Component E | — | — | 3 | — | — | — | — |
| Organic resin | 2.5* | 8 | 4 | — | — | — | — |
| Pigment | — | — | — | 43.4 | — | — | — |
| Others | — | — | — | 2.1 | — | — | 4 |
| Ratio of each component composition (%) | | | | | | | |
| A/ Total amount of composition | 15.4 | 15.9 | 10.9 | 12.7 | 16.0 | 11.6 | 18.3 |
| C/ Total amount of solids | 23 | 22 | 25.9 | 14.4 | 28.8 | 25.4 | 35.5 |
| B/A | 10 | 10 | 29 | 10 | 23.3 | 10 | 10 |
| D/ Total amount of composition | 75 | 73 | 70 | 67 | 72 | 83 | 67 |
| Silica/A | — | — | 43 | — | — | — | — |
| E/A | — | — | 14 | — | — | — | — |
| Organic resin/A | 15 | 20 | 19 | — | — | — | — |

*: Also including an emulsifier.

TABLE 5

|  | Example 29 | Example 30 | Example 31 | Example 32 | Example 33 | Example 34 |
|---|---|---|---|---|---|---|
| Composition (parts) Component A | | | | | | |
| Amount | 30 | 40 | 40 | 40 | 30 | 30 |
| Type | A-2 | A-1 | A-1 | A-1 | A-2 | A-2 |
| Component B | 7 | 4 | 4 | 4 | 7 | 7 |

TABLE 5-continued

|  | Example 29 | Example 30 | Example 31 | Example 32 | Example 33 | Example 34 |
|---|---|---|---|---|---|---|
| Component C | 10 | 25 | 15 | 15 | 9 | 15 |
| Component D | 150 | 146 | 175 | 175 | 171 | 135 |
| Silica | — | — | — | — | — | — |
| Component E | — | — | 20 | 20 | 4 | — |
| Organic resin | — | — | — | — | — | — |
| Pigment | — | — | — | — | — | — |
| Others | — | 4 | — | — | — | — |
| Ratio of each component composition (%) | | | | | | |
| A/Total amount of composition | 15.2 | 18.3 | 15.7 | 15.7 | 13.6 | 16.0 |
| C/Total amount of solids | 21.3 | 35.5 | 19 | 19 | 18 | 28.8 |
| B/A | 23 | 10 | 10 | 10 | 23 | 23 |
| D/Total amount of composition | 76 | 67 | 69 | 69 | 77 | 72 |
| Silica/A | — | — | — | — | — | — |
| E/A | — | — | 50 | 50 | 13.3 | — |
| Organic resin/A | — | — | — | — | — | — |

TABLE 6

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Composition (parts) | | | | | | | | |
| Component A | | | | | | | | |
| Amount | 40 | 40 | 40 | 40 | 40 | — | 30 | 40 |
| Type | A-1 | A-1 | A-1 | A-1 | Comparative A-1 | — | Comparative A-2 | A-1 |
| Component B | 4 | 4 | 4 | — | 4 | — | 5 | 7 |
| Component C | — | 1.5 | 180 | 15 | 15 | 10 | 10 | 3 |
| Component D | 297 | 299 | 420 | 185 | 285 | 58 | 150 | 297 |
| Silica | — | — | — | — | — | — | — | — |
| Component E | — | — | — | — | — | — | — | — |
| Organic resin | — | — | — | — | — | 42* | — | — |
| Pigment | — | — | — | — | — | — | — | — |
| Others | — | — | — | — | — | — | 4 | — |
| Ratio of each component composition (%) | | | | | | | | |
| A/Total amount of composition | 11.7 | 11.6 | 6.2 | 16.7 | 11.6 | 0 | 15.1 | 11.5 |
| C/Total amount of solids | — | 3.2 | 80.3 | 37.5 | 25.4 | 19.2 | 21.3 | 6.0 |
| B/A | 10 | 10 | 10 | — | 10 | — | 17 | 17.5 |
| D/Total amount of composition | 82 | 87 | 65 | 77 | 83 | 53 | 76 | 86 |
| Silica/A | — | — | — | — | — | — | — | — |
| E/A | — | — | — | — | — | — | — | — |
| Organic resin/A | — | — | — | — | — | — | — | — |

*: Also including an emulsifier.

TABLE 7

|  | Example 1 | Example 2 | Example 3 | Example 4 | Example 5 | Example 6 |
|---|---|---|---|---|---|---|
| Emulsion stability (1 month) | ○ | ○ | ○ | ○ | ○ | Δ |
| Emulsion stability (3 months) | ○ | ○ | ○ | ○ | ○ | ○ |
| Film-forming properties | ○ | ○ | ○ | ○ | ○ | ○ |
| Transparency (Haze-%) | 0.2 | 0.2 | 0.3 | 0.5 | 0.8 | 1.5 |

TABLE 7-continued

|  | Example 1 | Example 2 | Example 3 | Example 4 | Example 5 | Example 6 |
|---|---|---|---|---|---|---|
| Heating curing properties |  |  |  |  |  |  |
| Evaluation | ○ | ○ | ○ | ○ | ○ | ○ |
| Pencil strength | 4H | 4H | 2H | H | H | HB |
| Room-temperature curing properties |  |  |  |  |  |  |
| Evaluation | ○ | ○ | ○ | ○ | ○ | ○ |
| Pencil strength | 3H | 3H | H | F | F | HB |
| Resistance to cracking |  |  |  |  |  |  |
| 1 μm | ○ | ○ | ○ | ○ | ○ | ○ |
| 5 μm | Δ | Δ | Δ | X | X | X |
| 20 μm | Δ | X | X | X | X | X |
| Adherence | 100/100 | 100/100 | 100/100 | 100/100 | 100/100 | 100/100 |
| Rate of removal of acetaldehyde (%) | 5 | 15 | 45 | 70 | 95 | 98 |
| Contact angle (°) |  |  |  |  |  |  |
| Initial stage | ≦10 | ≦10 | ≦10 | ≦10 | ≦10 | ≦10 |
| After irradiation with UV rays | ≦10 | ≦10 | ≦10 | ≦10 | ≦10 | ≦10 |
| Weather resistance | Excellent | Excellent | Excellent | Excellent | Excellent | Excellent |

TABLE 8

|  | Example 7 | Example 8 | Example 9 | Example 10 | Example 11 | Example 12 | Example 13 |
|---|---|---|---|---|---|---|---|
| Emulsion stability (1 month) | ○ | ○ | ○ | ○ | ○ | Δ | ○ |
| Emulsion stability (3 months) | Δ | Δ | Δ | Δ | Δ | Δ | Δ |
| Film-forming properties | ○ | ○ | ○ | ○ | ○ | ○ | ○ |
| Transparency (Haze-%) | 0.2 | 0.2 | 0.3 | 0.5 | 0.8 | 1.5 | 1 |
| Heating curing properties |  |  |  |  |  |  |  |
| Evaluation | ○ | ○ | ○ | ○ | ○ | ○ | ○ |
| Pencil strength | 4H | 4H | 2H | H | H | HB | 4H |
| Room-temperature curing properties |  |  |  |  |  |  |  |
| Evaluation | ○ | ○ | ○ | ○ | ○ | ○ | ○ |
| Pencil strength | 3H | 3H | H | F | F | HB | 3H |
| Resistance to cracking |  |  |  |  |  |  |  |
| 1 μm | ○ | ○ | ○ | ○ | ○ | ○ | ○ |
| 5 μm | Δ | Δ | Δ | X | X | X | X |
| 20 μm | Δ | X | X | X | X | X | X |
| Adherence | 100/100 | 100/100 | 100/100 | 100/100 | 100/100 | 100/100 | 100/100 |
| Rate of removal of acetaldehyde (%) | 5 | 15 | 45 | 70 | 95 | 98 | 20 |
| Contact angle (°) |  |  |  |  |  |  |  |
| Initial stage | ≦10 | ≦10 | ≦10 | ≦10 | ≦10 | ≦10 | ≦10 |
| After irradiation with UV rays | ≦10 | ≦10 | ≦10 | ≦10 | ≦10 | ≦10 | ≦10 |
| Weather resistance | Excellent | Excellent | Excellent | Excellent | Excellent | Excellent | Excellent |

TABLE 9

|  | Example 14 | Example 15 | Example 16 | Example 17 | Example 18 | Example 19 | Example 20 |
|---|---|---|---|---|---|---|---|
| Emulsion stability (1 month) | ○ | ○ | ○ | ○ | ○ | ○ | ○ |
| Emulsion stability (3 months) | ○ | ○ | ○ | ○ | ○ | ○ | ○ |
| Film-forming properties | ○ | ○ | ○ | ○ | ○ | ○ | ○ |
| Transparency (Haze-%) | 0.3 | 0.5 | 0.4 | 0.2 | 0.3 | 0.2 | 0.5 |

TABLE 9-continued

|  | Example 14 | Example 15 | Example 16 | Example 17 | Example 18 | Example 19 | Example 20 |
| --- | --- | --- | --- | --- | --- | --- | --- |
| Heating curing properties |  |  |  |  |  |  |  |
| Evaluation | ○ | ○ | ○ | ○ | ○ | ○ | ○ |
| Pencil strength | 3H | 3H | 3H | 4H | 3H | H | H |
| Room-temperature curing properties |  |  |  |  |  |  |  |
| Evaluation | ○ | ○ | ○ | ○ | ○ | ○ | ○ |
| Pencil strength | 3H | 2H | 3H | 4H | 3H | H | F |
| Resistance to cracking |  |  |  |  |  |  |  |
| 1 μm | ○ | ○ | ○ | ○ | ○ | ○ | ○ |
| 5 μm | Δ | Δ | ○ | ○ | Δ | ○ | ○ |
| 20 μm | X | X | X | Δ | X | ○ | ○ |
| Adherence | 100/100 | 100/100 | 100/100 | 100/100 | 100/100 | 100/100 | 100/100 |
| Rate of removal of acetaldehyde (%) | 15 | 15 | 10 | 10 | 15 | 15 | 10 |
| Contact angle (°) |  |  |  |  |  |  |  |
| Initial stage | ≦10 | ≦10 | ≦10 | ≦10 | ≦10 | ≦10 | ≦10 |
| After irradiation with UV rays | ≦10 | ≦10 | ≦10 | ≦10 | ≦10 | ≦10 | ≦10 |
| Weather resistance | Excellent | Excellent | Excellent | Excellent | Excellent | Excellent | Excellent |

TABLE 10

|  | Example 21 | Example 22 | Example 23 | Example 24 | Example 25 | Example 26 | Example 27 |
| --- | --- | --- | --- | --- | --- | --- | --- |
| Emulsion stability (1 month) | ○ | ○ | ○ | ○ | ○ | ○ | ○ |
| Emulsion stability (1 month) | ○ | ○ | ○ | ○ | ○ | ○ | Δ |
| Emulsion stability (3 months) | ○ | ○ | ○ | ○ | ○ | ○ | ○ |
| Film-forming properties | ○ | ○ | ○ | ○ | ○ | ○ | ○ |
| Transparency (Haze-%) | 0.5 | 1.5 | 0.6 | 1 | — | 0.2 | 0.3 |
| Heating curing properties |  |  |  |  |  |  |  |
| Evaluation | ○ | ○ | ○ | ○ | ○ | ○ | ○ |
| Pencil strength | 2H | F | H | H | 4H | 4H | 2H |
| Room-temperature curing properties |  |  |  |  |  |  |  |
| Evaluation | ○ | ○ | ○ | ○ | ○ | ○ | ○ |
| Pencil strength | H | HB | F | H | 3H | 3H | H |
| Resistance to cracking |  |  |  |  |  |  |  |
| 1 μm | ○ | ○ | ○ | ○ | ○ | ○ | ○ |
| 5 μm | ○ | ○ | ○ | ○ | ○ | X | ○ |
| 20 μm | Δ | ○ | ○ | ○ | Δ | X | X |
| Adherence | 100/100 | 100/100 | 100/100 | 100/100 | 100/100 | 100/100 | 100/100 |
| Rate of removal of acetaldehyde (%) | 10 | 15 | 15 | 15 | 10 | 15 | 15 |
| Contact angle (°) |  |  |  |  |  |  |  |
| Initial stage | ≦10 | ≦10 | ≦10 | ≦10 | ≦10 | ≦10 | ≦10 |
| After irradiation with UV rays | ≦10 | ≦10 | ≦10 | ≦10 | ≦10 | ≦10 | ≦10 |
| Weather resistance | Excellent | Yellowing | Excellent | Excellent | Excellent | Excellent | Excellent |

TABLE 11

|  | Example 28 | Example 29 | Example 30 | Example 31 | Example 32 | Example 33 | Example 34 |
| --- | --- | --- | --- | --- | --- | --- | --- |
| Emulsion stability (1 month) | ○ | ○ | ○ | ○ | ○ | ○ | ○ |
| Emulsion stability (3 months) | Δ | ○ | Δ | ○ | ○ | ○ | ○ |
| Film-forming properties | ○ | ○ | ○ | ○ | ○ | ○ | Δ |
| Transparency (Haze-%) | 2.0 | 1.8 | 1.2 | 0.3 | 0.2 | 5.0 | 0.5 |

TABLE 11-continued

|  | Example 28 | Example 29 | Example 30 | Example 31 | Example 32 | Example 33 | Example 34 |
|---|---|---|---|---|---|---|---|
| Heating curing properties |  |  |  |  |  |  |  |
| Evaluation | ○ | ○ | ○ | ○ | ○ | ○ | ○ |
| Pencil strength | 3H | 3H | 3H | 2H | H | F | H |
| Room-temperature curing properties |  |  |  |  |  |  |  |
| Evaluation | ○ | ○ | ○ | ○ | ○ | ○ | ○ |
| Pencil strength | 3H | 2H | 2H | H | F | HB | F |
| Resistance to cracking |  |  |  |  |  |  |  |
| 1 μm | ○ | ○ | ○ | ○ | ○ | ○ | ○ |
| 5 μm | X | Δ | X | ○ | ○ | ○ | ○ |
| 20 μm | X | X | X | X | ○ | ○ | ○ |
| Adherence | 100/100 | 100/100 | 100/100 | 100/100 | 100/100 | 100/100 | 100/100 |
| Rate of removal of acetaldehyde (%) | 10 | 5 | 30 | 15 | 15 | 10 | 15 |
| Contact angle (°) |  |  |  |  |  |  |  |
| Initial stage | ≦10 | ≦10 | ≦10 | ≦10 | ≦10 | ≦10 | ≦10 |
| After irradiation with UV rays | ≦10 | ≦10 | ≦10 | ≦10 | ≦10 | ≦10 | ≦10 |
| Weather resistance | Excellent | Yellowing | Excellent | Excellent | Excellent | Excellent | Excellent |

TABLE 12

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Emulsion stability (1 month) | ○ | ○ | Δ | X | ○ | ○ | ○ | X |
| Emulsion stability (3 months) | ○ | ○ | X | X | Δ | ○ | ○ | X |
| Film-forming properties | ○ | ○ | ○ | X | ○ | ○ | ○ | X |
| Transparency (Haze-%) | 0.2 | 0.2 | 1.2 | 25 | 0.5 | 2.5 | * | 0.2 |
| Heating curing properties |  |  |  |  |  |  |  |  |
| Evaluation | ○ | ○ | X | — | X | ○ | Crack | — |
| Pencil strength | 4H | 4H | — | — | — | HB | * | — |
| Room-temperature curing properties |  |  |  |  |  |  |  |  |
| Evaluation | ○ | ○ | X | — | X | ○ | Crack | — |
| Pencil strength | 4H | 4H | — | — | — | ≦2H | * | — |
| Resistance to cracking |  |  |  |  |  |  |  |  |
| 1 μm | ○ | ○ | — | — | — | ○ | X | — |
| 5 μm | Δ | Δ | — | — | — | ○ | X | — |
| 20 μm | X | X | — | — | — | ○ | X | — |
| Adherence | 100/100 | 100/100 | — | — | — | 100/100 | — | — |
| Rate of removal of acetaldehyde (%) | 0 | 0 | — | — | — | 10 | — | — |
| Contact angle (°) |  |  |  |  |  |  |  |  |
| Initial stage | ≦10 | ≦10 | — | — | — | ≦10 | — | — |
| After irradiation with UV rays | 70 | 60 | — | — | — | Chalking | — | — |
| Weather resistance | Excellent | Excellent | — | — | — | Chalking | — | — |

*: Cannot be evaluated due to cracking.

TABLE 13

|  | Example 35 | Example 36 | Example 37 | Example 38 | Example 39 | Example 40 | Example 41 | Example 42 |
|---|---|---|---|---|---|---|---|---|
| Substrate | Stainless steel plate | Stainless steel plate | Acrylic resin-coated plate | Acrylic resin-coated plate | PC plate | PC plate | Slate plate | Slate plate |

TABLE 13-continued

|  | Example 35 | Example 36 | Example 37 | Example 38 | Example 39 | Example 40 | Example 41 | Example 42 |
|---|---|---|---|---|---|---|---|---|
| Coating material | Example 2 | Example 2 | Example 2 | Example 2 | Example 2 | Example 2 | Example 2 | Example 2 |
| Primer | Present | Absent | Present | Absent | Present | Absent | Present | Absent |
| Adherence |  |  |  |  |  |  |  |  |
| 1 μm | 100/100 | 0/100 | 100/100 | 80/100 | 100/100 | 0/100 | 100/100 | 0/100 |
| 20 μm | 100/100 | 0/100 | 100/100 | 30/100 | 100/100 | 0/100 | 100/100 | 0/100 |
| Resistance to boiling water |  |  |  |  |  |  |  |  |
| 1 μm | Excellent | Peeling from whole face | Excellent | Peeling from whole face | Excellent | Peeling from whole face | Excellent | Peeling from whole face |
| 20 μm | Cracking on whole face | Peeling from whole face | Cracking on whole face | Peeling from whole face | Cracking on whole face | Peeling from whole face | Partial peeling | Peeling from whole face |
| Rate of removal of acetaldehyde (%) | 15 | 15 | 15 | 15 | 15 | 15 | 15 | 15 |
| Contact angle (°) |  |  |  |  |  |  |  |  |
| Initial stage | ≦10 | ≦10 | ≦10 | ≦10 | ≦10 | ≦10 | ≦10 | ≦10 |
| After irradiation with UV rays | ≦10 | Peeling | ≦10 | Peeling | ≦10 | Peeling | ≦10 | Peeling |

TABLE 14

|  | Example 43 | Example 44 | Example 45 | Example 46 |
|---|---|---|---|---|
| Substrate | Inorganic coated plate | Inorganic coated plate | FRP plate | FRP plate |
| Coating material | Example 2 | Example 2 | Example 2 | Example 2 |
| Primer | Present | Absent | Present | Absent |
| Adherence |  |  |  |  |
| 1 μm | 100/100 | 100/100 | 100/100 | 70/100 |
| 20 μm | 100/100 | 90/100 | 100/100 | 20/100 |
| Resistance to boiling water |  |  |  |  |
| 1 μm | Excellent | Excellent | Excellent | Peeling from whole face |
| 20 μm | Cracking on whole face | Cracking on whole face | Cracking on whole face | Peeling from whole face |
| Rate of removal of acetaldehyde (%) | 15 | 15 | 15 | 15 |
| Contact angle (°) |  |  |  |  |
| Initial stage | ≦10 | ≦10 | ≦10 | ≦10 |
| After irradiation with UV rays | ≦10 | ≦10 | ≦10 | Peeling |

TABLE 15

|  | Example 47 | Example 48 | Example 49 | Example 50 | Example 51 | Example 52 | Example 53 | Example 54 |
|---|---|---|---|---|---|---|---|---|
| Substrate | Stainless steel plate | Stainless steel plate | Acrylic resin-coated plate | Acrylic resin-coated plate | PC plate | PC plate | Slate plate | Slate plate |
| Coating material | Example 18 | Example 18 | Example 18 | Example 18 | Example 18 | Example 18 | Example 18 | Example 18 |
| Primer | Present | Absent | Present | Absent | Present | Absent | Present | Absent |
| Adherence |  |  |  |  |  |  |  |  |
| 1 μm | 100/100 | 100/100 | 100/100 | 100/100 | 100/100 | 100/100 | 100/100 | 100/100 |
| 20 μm | 100/100 | 90/100 | 100/100 | 90/100 | 100/100 | 50/100 | 100/100 | 80/100 |

TABLE 15-continued

|  | Example 47 | Example 48 | Example 49 | Example 50 | Example 51 | Example 52 | Example 53 | Example 54 |
|---|---|---|---|---|---|---|---|---|
| Resistance to boiling water |  |  |  |  |  |  |  |  |
| 1 μm | Excellent | Excellent | Excellent | Excellent | Excellent | Excellent | Excellent | Excellent |
| 20 μm | Excellent | Excellent | Excellent | Excellent | Excellent | Excellent | Excellent | Excellent |
| Rate of removal of acetaldehyde (%) | 15 | 15 | 15 | 15 | 15 | 15 | 15 | 15 |
| Contact angle (°) |  |  |  |  |  |  |  |  |
| Initial stage | ≦10 | ≦10 | ≦10 | ≦10 | ≦10 | ≦10 | ≦10 | ≦10 |
| After irradiation with UV rays | ≦10 | ≦10 | ≦10 | ≦10 | ≦10 | ≦10 | ≦10 | ≦10 |

TABLE 16

|  | Example 55 | Example 56 | Example 57 | Example 58 |
|---|---|---|---|---|
| Substrate | Inorganic coated plate | Inorganic coated plate | FPR plate | FRP plate |
| Coating material | Example 18 | Example 18 | Example 18 | Example 18 |
| Primer | Present | Absent | Present | Absent |
| Adherence |  |  |  |  |
| 1 μm | 100/100 | 100/100 | 100/100 | 100/100 |
| 20 μm | 100/100 | 100/100 | 100/100 | 90/100 |
| Resistance to boiling water |  |  |  |  |
| 1 μm | Excellent | Excellent | Excellent | Excellent |
| 20 μm | Excellent | Excellent | Excellent | Excellent |
| Rate of removal of acetaldehyde (%) | 15 | 15 | 15 | 15 |
| Contact angle (°) |  |  |  |  |
| Initial stage | ≦10 | ≦10 | ≦10 | ≦10 |
| After irradiation with UV rays | ≦10 | ≦10 | ≦10 | ≦10 |

TABLE 17

|  | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| Substrate | Stainless steel plate | Stainless steel plate | Acrylic resin-coated plate | Acrylic resin-coated plate | PC plate | PC plate | Slate plate | Slate plate |
| Coating material | Comparative Example 1 | Comparative Example 1 | Comparative Example 1 | Comparative Example 1 | Comparative Example 1 | Comparative Example 1 | Comparative Example 1 | Comparative Example 1 |
| Primer | Present | Absent | Present | Absent | Present | Absent | Present | Absent |
| Adherence |  |  |  |  |  |  |  |  |
| 1 μm | 100/100 | 0/100 | 100/100 | 85/100 | 100/100 | 0/100 | 100/100 | 0/100 |
| 20 μm | 100/100 | 0/100 | 100/100 | 50/100 | 100/100 | 0/100 | 100/100 | 0/100 |
| Resistance to boiling water |  |  |  |  |  |  |  |  |
| 1 μm | Excellent | Peeling from whole face | Excellent | Peeling from whole face | Excellent | Peeling from whole face | Excellent | Peeling from whole face |
| 20 μm | Cracking on whole face | Peeling from whole face | Cracking on whole face | Peeling from whole face | Cracking on whole face | Peeling from whole face | Cracking on whole face | Peeling from whole face |
| Rate of removal of acetaldehyde (%) | 0 | 0 | 0 | 0 | 0 | 0 | 0 | 0 |
| Contact angle (°) |  |  |  |  |  |  |  |  |
| Initial stage | ≦10 | ≦10 | ≦10 | ≦10 | ≦10 | ≦10 | ≦10 | ≦10 |

TABLE 17-continued

|  | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| After irradiation with UV rays | 70 | Peeling from whole face | 65 | Peeling from whole face | 70 | Peeling from whole face | 55 | Peeling from whole face |

TABLE 18

|  | Comparative Example 17 | Comparative Example 18 | Comparative Example 19 | Comparative Example 20 |
|---|---|---|---|---|
| Substrate | Inorganic coated plate | Inorganic coated plate | FPR plate | FRP plate |
| Coating material | Comparative Example 1 | Comparative Example 1 | Comparative Example 1 | Comparative Example 1 |
| Primer | Present | Absent | Present | Absent |
| Adherence |  |  |  |  |
| 1 μm | 100/100 | 100/100 | 100/100 | 80/100 |
| 20 μm | 100/100 | 90/100 | 100/100 | 40/100 |
| Resistance to boiling water |  |  |  |  |
| 1 μm | Excellent | Excellent | Excellent | Peeling from whole face |
| 20 μm | Excellent | Excellent | Excellent | Peeling from whole face |
| Rate of removal of acetaldehyde (%) | 0 | 0 | 0 | 0 |
| Contact angle (°) |  |  |  |  |
| Initial stage | ≦10 | ≦10 | ≦10 | ≦10 |
| After irradiation with UV rays | 70 | 60 | 60 | Peeling from whole face |

EFFECT OF THE INVENTION

The antifouling silicone emulsion coating-composition of the present invention is an emulsion and the photo-semiconductor is dispersed stably and uniformly, thus demonstrating various characteristics such as antifouling properties, antifogging properties, antimicrobial properties, deodorizing effect etc. derived from the photo-catalytic action of the photo-semiconductor while being capable of forming a highly transparent cured coat.

Because the antifouling silicone emulsion coating-composition of the present invention is an inorganic type, even upon exposure to UV rays its cured coat is hardly corroded due to active oxygen generated by the photo-catalytic action of the photo-semiconductor contained in said coat, and is thus excellent in weather resistance, durability etc.

The antifouling silicone emulsion coating-composition of the present invention is aqueous and thus causes less environmental problem. Further, it is stable as an emulsion for a prolonged period of time and its color can be controlled in a wide variety of colors.

The antifouling silicone emulsion coating-composition of the present invention can be cured without a curing agent at a lower temperatures than 300° C. and even at room temperature by use of a curing catalyst. Therefore, the composition of the present invention can be used under wide drying curing conditions or temperature range. Accordingly, the composition of the present invention can be applied onto substrates with shapes which cannot be heated uniformly or substrates with large dimensions, or substrates inferior in thermostability. Its application is feasible in outdoor working sites which cannot be uniformly heated, so the present invention is of high industrial worth.

As the antifouling silicone emulsion coating-composition of the present invention may not require a curing catalyst, its costs can be reduced and its curing hardly proceeds during storage (its pot life is long).

According to the present process for producing the antifouling silicone emulsion coating-composition, emulsification of the composition containing the photo-semiconductor can be effected excellently. Therefore, the above excellent antifouling silicone emulsion coating-composition can be produced.

The cured coat applied to the article of the present invention is formed from said antifouling silicone emulsion coating-composition containing the photo-semiconductor dispersed uniformly in it, and contains the photo-semiconductor uniformly dispersed in said coat, thus demonstrating various characteristics such as antifouling properties, antifogging properties, antimicrobial properties, deodorizing effect etc. derived from the photo-catalytic action of the photo-semiconductor. The cured coat of the present invention has also high transparency. Because said coat is formed from said antifouling silicone emulsion coating-composition, the coat is hardly corroded by active oxygen generated by the photo-catalytic action of the photo-semiconductor contained in said coat even upon exposure to UV rays. Thus its coat performance is hardly deteriorated, being excellent in weather resistance, durability etc.

The antifouling article of the present invention can be produced using said antifouling silicone emulsion coating composition whose color can be controlled in a wide variety of colors, and thus its design can be, improved and it has a wide variety of utilities.

The antifouling article of the present invention is produced using said antifouling coating composition which can be cured at a lower temperature than 300° C. and even at room temperature. The antifouling article can be produced under wide drying curing conditions or temperature range. Accordingly, substrates with shapes which cannot be heated uniformly, substrates with large dimensions, or substrates inferior in thermostability can also be used, and their coated articles can be produced in outdoor working sites which cannot be uniformly heated, so that the present invention is of high industrial worth.

What is claimed is:

1. An antifouling silicone emulsion coating-composition comprising following components (A), (B), (C) and (D), wherein an amount of the component (C) incorporated is in the range of 5 to 80% by weight relative to the total solid contents in the composition:
   (A) partially hydrolyzed organosiloxane with a weight-average molecular weight of 600 to 5000 (determined using a polystyrene calibration curve), represented by the average formula (I): $R^2aSiOb(OR^1)c(OH)d$ wherein $R^1$ and $R^2$ represent a monovalent hydrocarbon group; a, b, c and d are numerals satisfying the following relationships: $a+2b+c+d=4$, $0 \leq a<3$, $0<b<2$, $0<c<4$, and $0<d<4$;
   (B) nonionic surface active agent;
   (C) photo-semiconductor; and
   (D) water.

2. An antifouling silicone emulsion coating-composition comprising following components (A), (B), (C) and (D), wherein an amount of the component (C) incorporated is in the range of 5 to 80% by weight relative to the total solid contents in the composition:
   (A) partially hydrolyzed organosiloxane with a weight-average molecular weight of 600 to 5000 (determined using a polystyrene calibration curve), represented by the average formula (I): $R^2aSiOb(OR^1)c(OH)d$ wherein $R^1$ and $R^2$ represent a monovalent hydrocarbon group; a, b, c and d are numerals satisfying the following relationships: $a+2b+c+d=4$, $0 \leq a<3$, $0<b<2$, $0<c<4$, and $0<d<4$;
   (B) anionic surface active agent;
   (C) photo-semiconductor; and
   (D) water.

3. An antifouling silicone emulsion coating-composition according to claim 1 wherein HLB of the nonionic surface active agent is 9 or more.

4. An antifouling silicone emulsion coating-composition according to any one of claims 1 to 3 wherein the component (C) is titanium oxide.

5. An antifouling silicone emulsion coating-composition according to claim 1 wherein the component (C) is fine particles with an average primary particle diameter of 0.001 to 0.03 μm.

6. An antifouling silicone emulsion coating-composition according to claim 1, further comprising colloidal silica.

7. An antifouling silicone emulsion coating-composition according to claim 1, further comprising the following component (E):
   (E) straight-chain polysiloxane diol containing hydroxyl groups at both terminals, represented by the average formula (II): $HO(R^3_2SiO)nH$ wherein $R^3$ represents a monovalent hydrocarbon group, and n is a numeral of $3 \leq n \leq 50$.

8. An antifouling silicone emulsion coating-composition according to claim 1, further comprising at least one organic resin selected from the group consisting of alkyd resin, epoxy resin, acrylic resin, acrylic silicone resin, phenol resin, fluorine resin, polyester resin, chlorinated rubber resin, urethane resin and melamine resin.

9. An antifouling silicone emulsion coating-composition according to claim 8 wherein the organic resin is the following component (F):
   (F) acrylic resin which is a copolymer of monomers represented by the general formula (III): $CH_2=CR^4(COOR^5)$ wherein $R^4$ represents a hydrogen atom or a methyl group, said monomers comprising a first (meth)acrylate wherein $R^5$ is a substituted or unsubstituted C1 to C9 monovalent hydrocarbon group, a second (meth)acrylate wherein $R^5$ is at least one group selected from the group consisting of an epoxy group, a glycidyl group, and a hydrocarbon group containing an epoxy group and/or a glycidyl group, and a third (meth)acrylate wherein $R^5$ is a hydrocarbon group containing an alkoxysilyl group and/or a halogenated silyl group.

10. An antifouling silicone emulsion coating-composition according to claim 1, further comprising a pigment.

11. A process for producing an antifouling silicone emulsion coating-composition, comprising the step of;
   mixing an emulsion containing the following components (A), (B) and (D) with a powder of the following component (C) and/or a dispersion having said powder dispersed in the following component (D):
   (A) partially hydrolyzed organosiloxane with a weight-average molecular weight of 600 to 5000 (determined using a polystyrene calibration curve), represented by the average formula (I): $R^2aSiOb(OR^1)c(OH)d$ wherein $R^1$ and $R^2$ represent a monovalent hydrocarbon group; a, b, c and d are numerals satisfying the following relationships: $a+2b+c+d=4$, $0 \leq a<3$, $0<b<2$, $0<c<4$, and $0<d<4$;
   (B) surface active agent;
   (C) photo-semiconductor; and
   (D) water.

12. A process for producing an antifouling silicone emulsion coating-composition, comprising the step of:
   removing an organic solvent from a mixture of the following component (A), a part of component (B), component (C), and the organic solvent to obtain a desolvated material; and,
   mixing said desolvated material with the following components (B) and (D):
   (A) partially hydrolyzed organosiloxane with a weight-average molecular weight of 600 to 5000 (determined using a polystyrene calibration curve), represented by the average formula (I): $R^2aSiOb(OR^1)c(OH)d$ wherein $R^1$ and $R^2$ represent a monovalent hydrocarbon group; a, b, c and d are numerals satisfying the following relationships: $a+2b+c+d=4$, $0 \leq a<3$, $0<b<2$, $0<c<4$, and $0<d<4$;
   (B) surface active agent;
   (C) photo-semiconductor; and
   (D) water.

13. A process for producing an antifouling silicone emulsion coating-composition, comprising the step of;
   mixing a hydrolyzable organosilane represented by the general formula (IV): $R^2_mSi(OR^1)_{4-m}$ (wherein $R^1$ and $R^2$ represent a monovalent hydrocarbon group, and m is an integer of 0 to 3), a powder of the following component (C) and/or a dispersion thereof, and the following component (D), to give a mixture containing the following components (A) and (C); and, mixing said mixture with the following component (B), and an additional component (D) if required:
- (A) partially hydrolyzed organosiloxane with a weight-average molecular weight of 600 to 5000 (determined using a polystyrene calibration curve), represented by the average formula (I): $R^2{}_a SiO_b (OR^1)_c(OH)_d$ wherein $R^1$ and $R^2$ represent a monovalent hydrocarbon group; a, b, c and d are numerals satisfying the following relationships: $a+2b+c+d=4$, $0 \leq a<3$, $0<b<2$, $0<c<4$, and $0<d<4$;
- (B) surface active agent;
- (C) photo-semiconductor; and
- (D) water.

14. An antifouling article having an applied and cured coat of the antifouling silicone emulsion coating-composition described in claim 1 provided on the surface of a substrate.

15. An antifouling article according to claim 14, wherein the substrate is selected from the group consisting of an inorganic substrate, organic substrate, inorganic/organic composite substrate, and a coated substrate having an inorganic coat and/or an organic coat on any one of said substrates, and a coated substrate having an organic inorganic composite coat thereon and a substrate having a laminated coat thereof.

16. An antifouling article according to claim 15 wherein the coat on the surface of said substrate is a primer layer.

* * * * *